(12) United States Patent
Dhonde

(10) Patent No.: US 12,017,711 B2
(45) Date of Patent: Jun. 25, 2024

(54) SINGLY STEERABLE, SERPENTINE STEEL TRACK CRAWLER TRANSFORMABLE INTO MULTI-TRACK CRAWLER AND WHEELED VEHICLE

(71) Applicant: KOKEROD HOLDINGS B.V., Utrecht (NL)

(72) Inventor: Anil Tukaram Dhonde, San Jose, CA (US)

(73) Assignee: KOKEROD HOLDINGS B.V., Utrecht (NL)

( * ) Notice: Subject to any disclaimer, the term of this patent is extended or adjusted under 35 U.S.C. 154(b) by 460 days.

(21) Appl. No.: 16/772,386

(22) PCT Filed: Dec. 10, 2018

(86) PCT No.: PCT/CA2018/051574
§ 371 (c)(1),
(2) Date: Jun. 12, 2020

(87) PCT Pub. No.: WO2019/119114
PCT Pub. Date: Jun. 27, 2019

(65) Prior Publication Data
US 2021/0078654 A1 Mar. 18, 2021

(30) Foreign Application Priority Data
Dec. 19, 2017 (IN) .............................. 201721045530

(51) Int. Cl.
*B62D 55/20* (2006.01)
*A01B 59/00* (2006.01)
(Continued)

(52) U.S. Cl.
CPC ............ *B62D 55/20* (2013.01); *A01B 59/002* (2013.01); *B60S 9/02* (2013.01); *B62D 11/22* (2013.01); *B62D 55/06* (2013.01); *B62D 55/07* (2013.01); *B62D 55/21* (2013.01)

(58) Field of Classification Search
CPC ....... A01B 59/002; A01B 69/008; B60S 9/02; B62D 11/22; B62D 55/06; B62D 55/07; B62D 55/20; B62D 55/21
USPC .......................................................... 180/9.1
See application file for complete search history.

(56) References Cited

U.S. PATENT DOCUMENTS 2,061,223 A * 11/1936 Cunningham ....... B62D 55/205
305/164
4,051,914 A 10/1977 Pohjola
(Continued)

FOREIGN PATENT DOCUMENTS

DE 3626238 A1 2/1988
DE 3626238 C2 4/1991
(Continued)

OTHER PUBLICATIONS

European Search Report for EP 18892989, EPO, search completed: Sep. 28, 2021, report dated Oct. 7, 2021.
(Continued)

*Primary Examiner* — Minnah L Seoh
*Assistant Examiner* — Felicia L. Brittman
(74) *Attorney, Agent, or Firm* — McCarter & English, LLP; James M. Smedley; Alex Korona

(57) ABSTRACT

There is provided a singly steerable, serpentine steel track crawler. The single-track crawler can steer independently in a serpentine fashion. Two or more single crawler tracks side-by-side can be transformed into a multi-track crawler vehicle. The single-track crawler or multi-track crawler vehicle can be fitted with rubber tires for plying on paved roads. This makes it a versatile, multi-terrain vehicle for agriculture and earth-moving applications.

28 Claims, 29 Drawing Sheets

(51) Int. Cl.
*B60S 9/02* (2006.01)
*B62D 11/22* (2006.01)
*B62D 55/06* (2006.01)
*B62D 55/07* (2006.01)
*B62D 55/21* (2006.01)

(56) References Cited

U.S. PATENT DOCUMENTS 6,517,457 B2 * 2/2003 Schempf ................ B62D 55/24
474/152
9,051,009 B2 6/2015 Prohaska

FOREIGN PATENT DOCUMENTS

EP 3517416 B1 * 5/2021 .......... A47L 11/4066
WO 0236417 A1 5/2002

OTHER PUBLICATIONS

International Search Report for PCT/CA2018/051574, CIPO, international filing: Dec. 10, 2018, search completed: Feb. 6, 2019, dated Feb. 20, 2019.
Office Action for 201721045530, Intellectual Property India, application filed: Dec. 19, 2017, report dated Mar. 22, 2022.
Written Opinion of the International Search Authority for PCT/CA2018/051574, CIPO, international filing: Dec. 10, 2018, search completed: Feb. 6, 2019, dated Feb. 20, 2019.

* cited by examiner

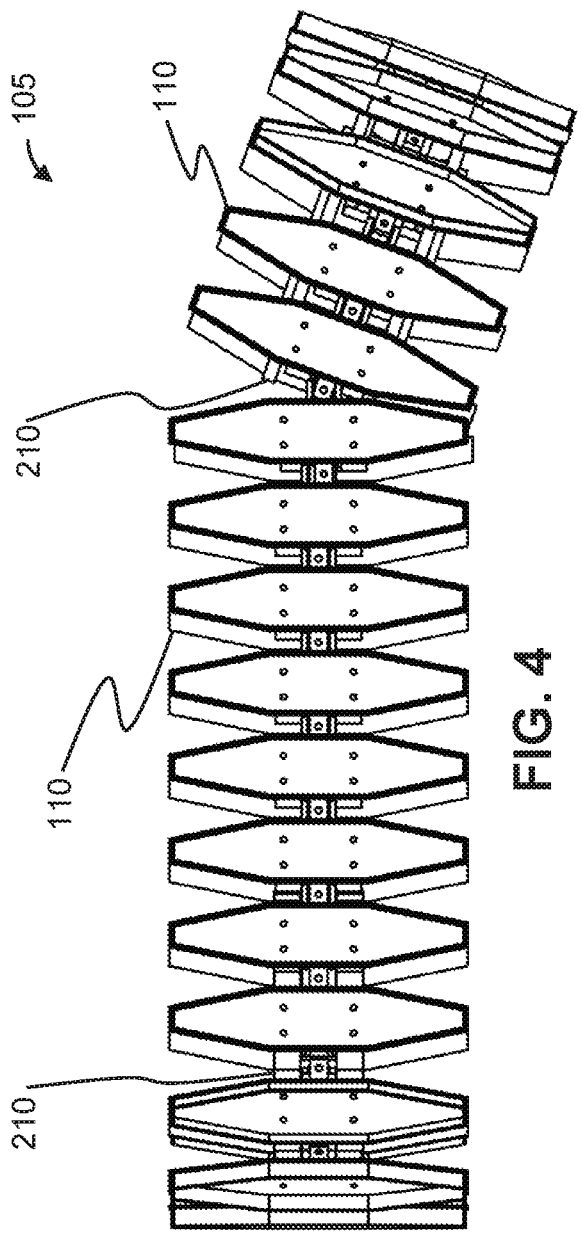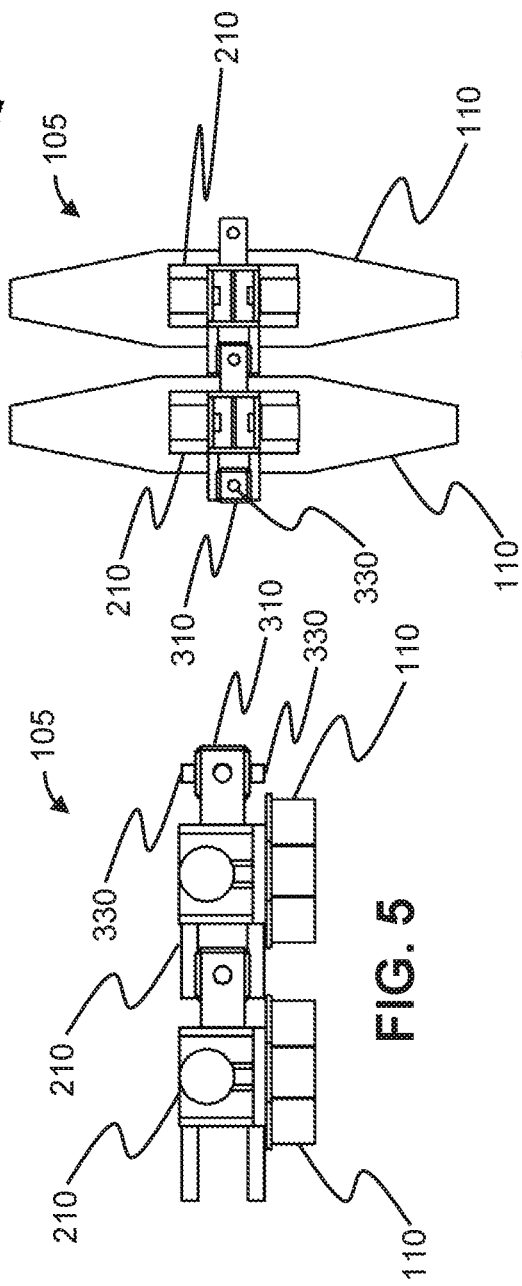

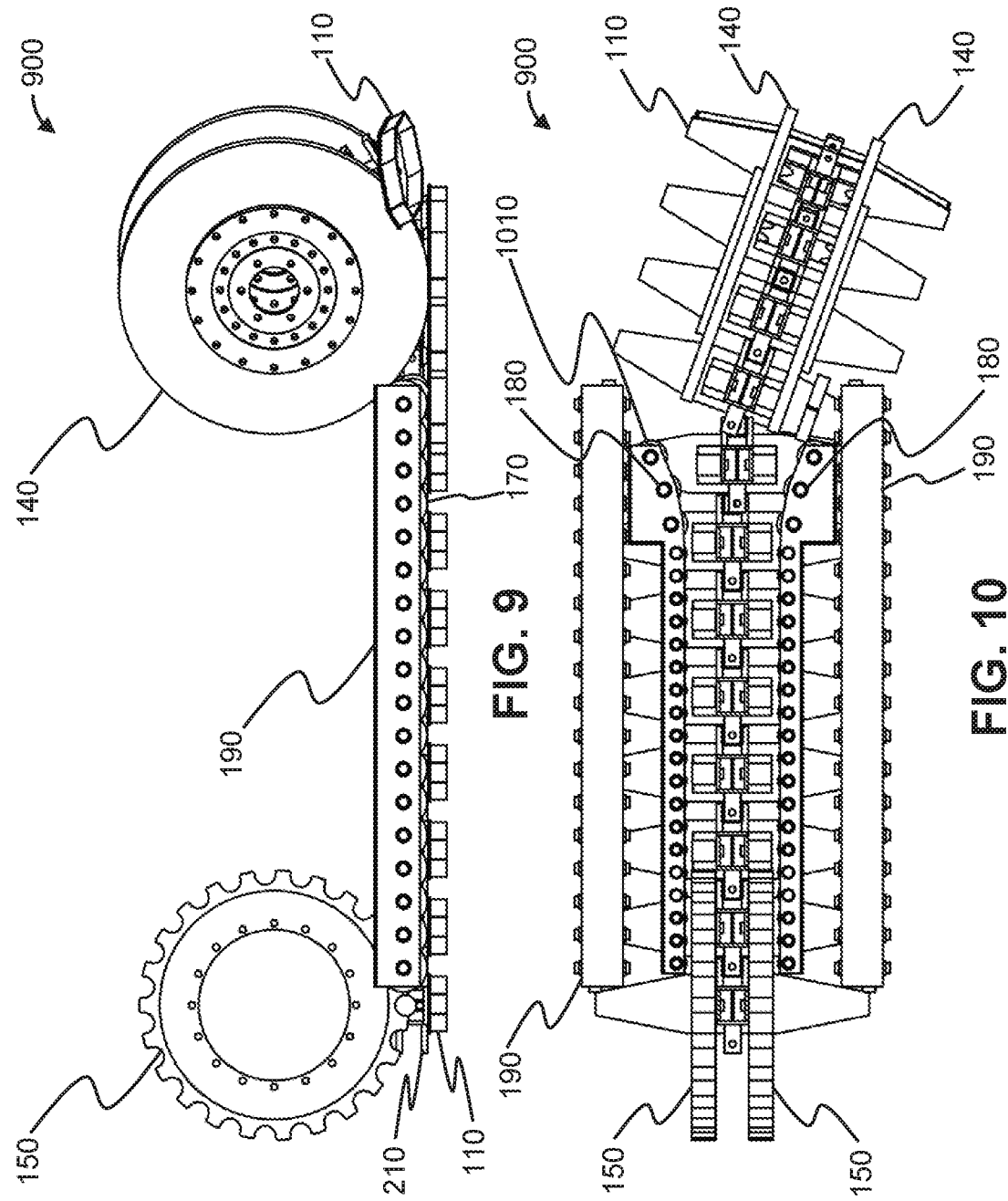

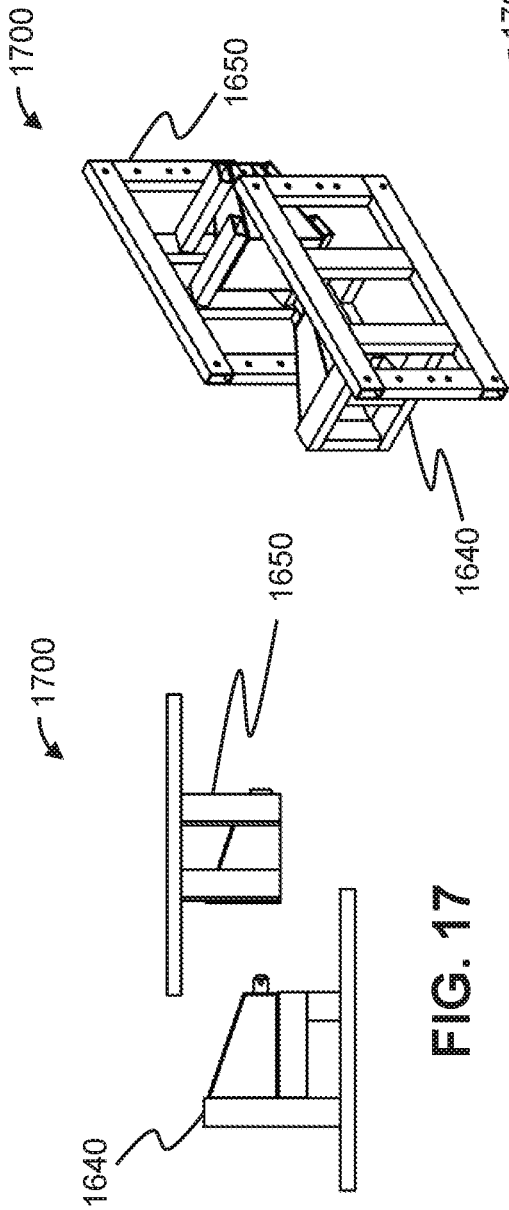
FIG. 17
FIG. 19
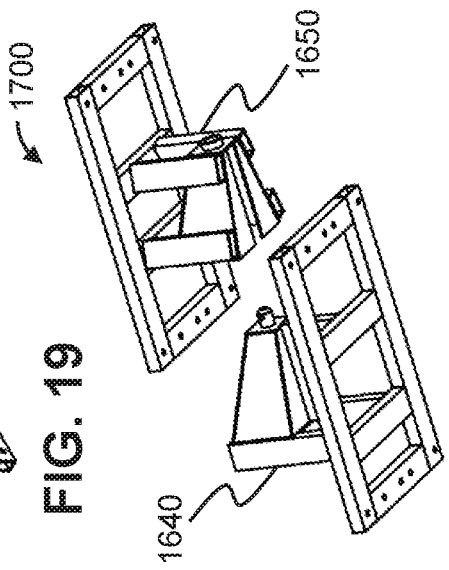
FIG. 20
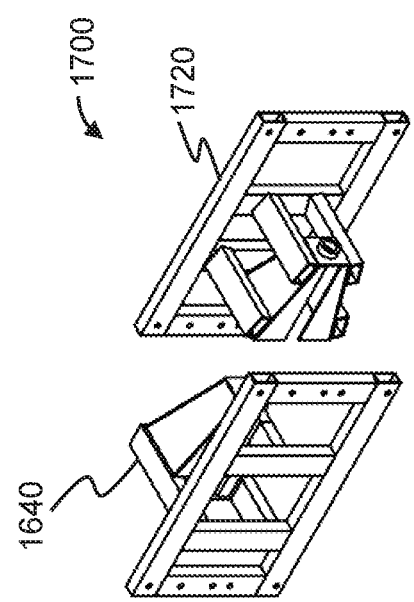
FIG. 18

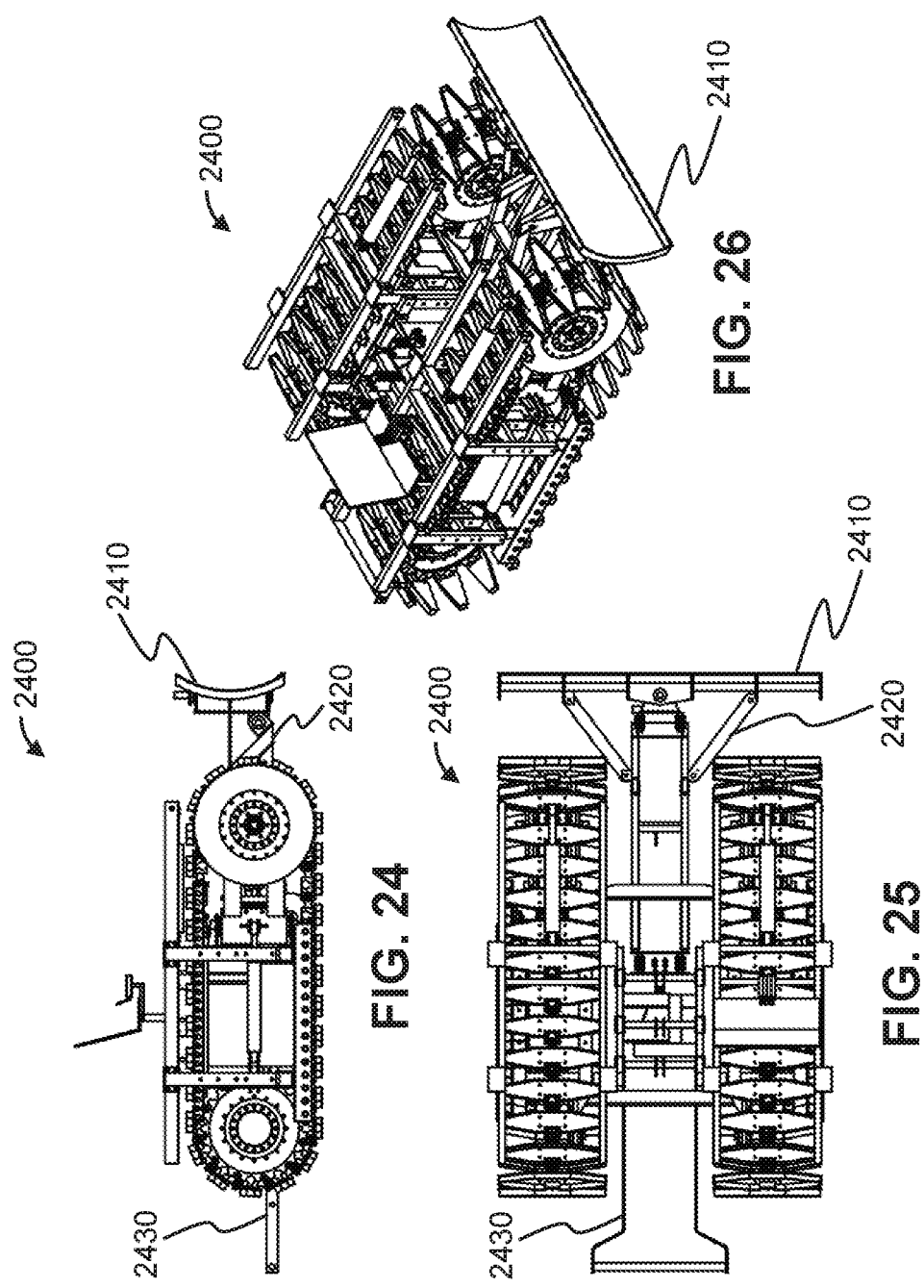

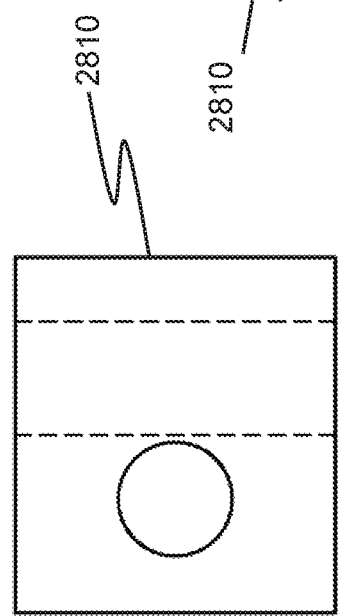
FIG. 29
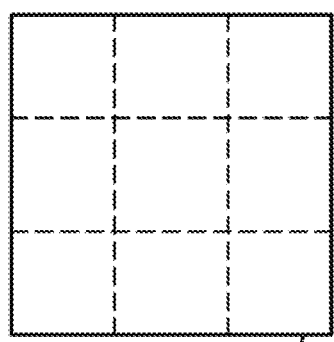
FIG. 30
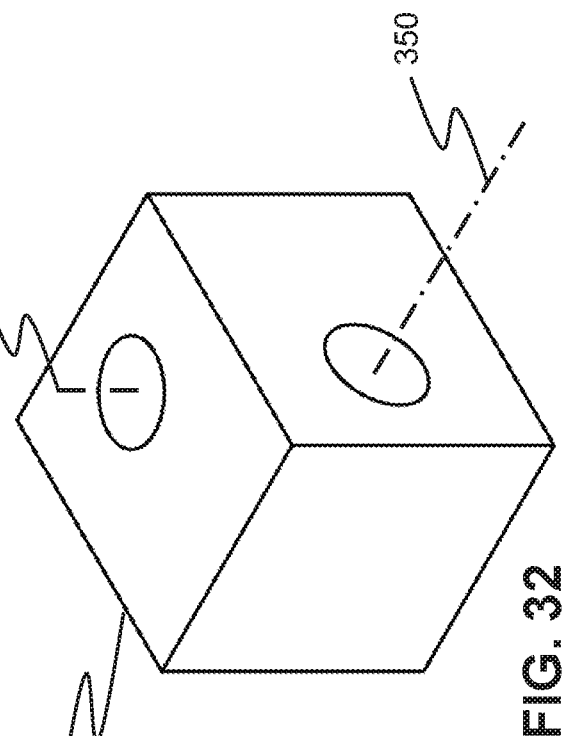
FIG. 31
FIG. 32

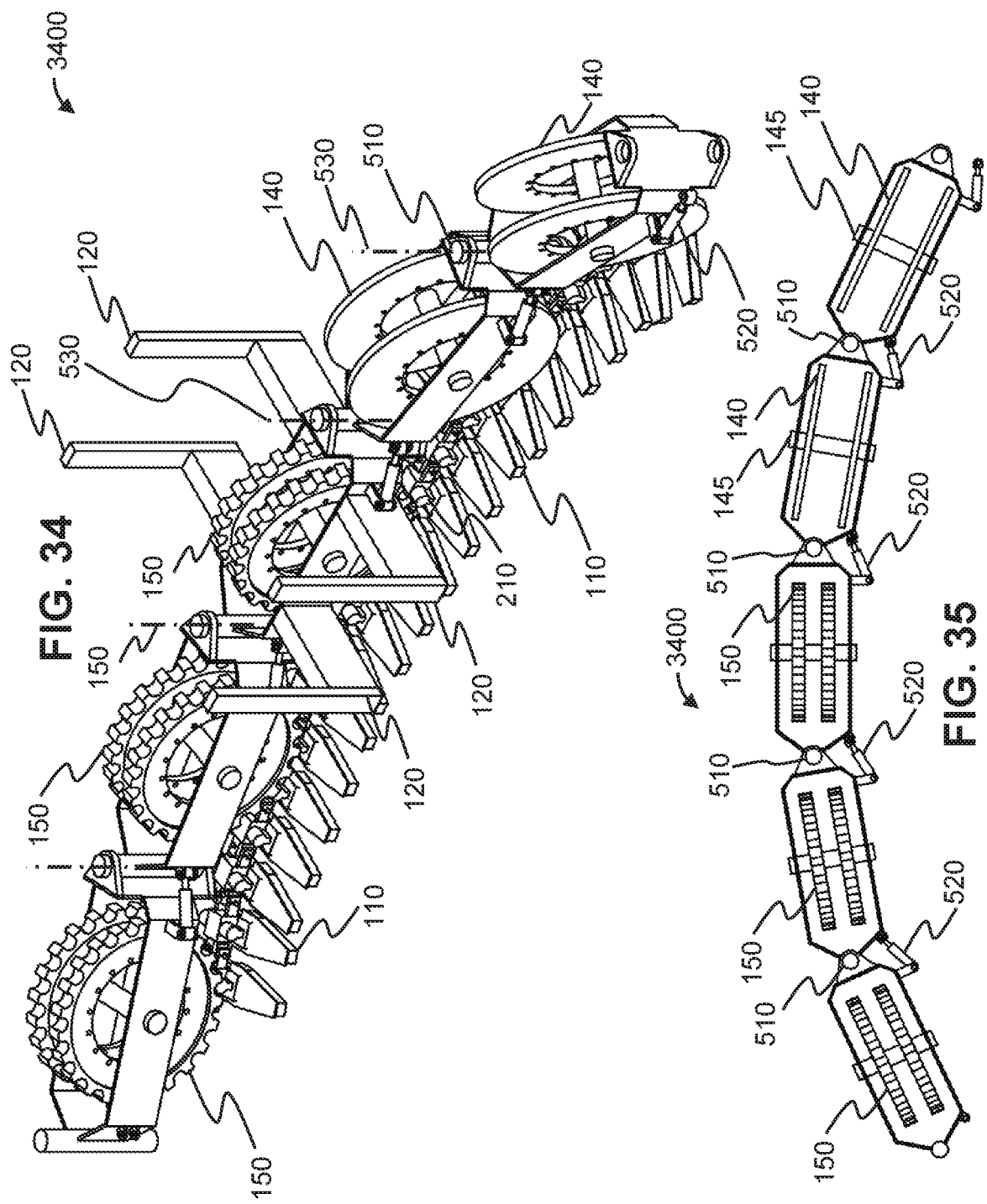

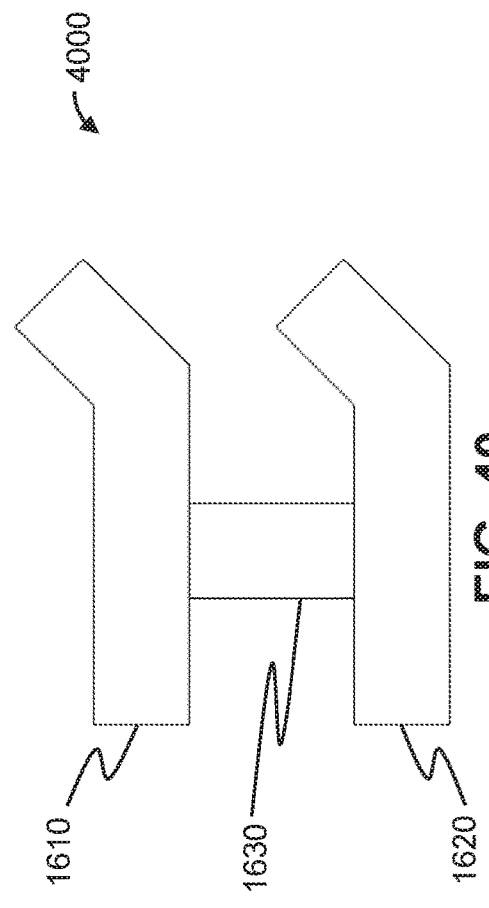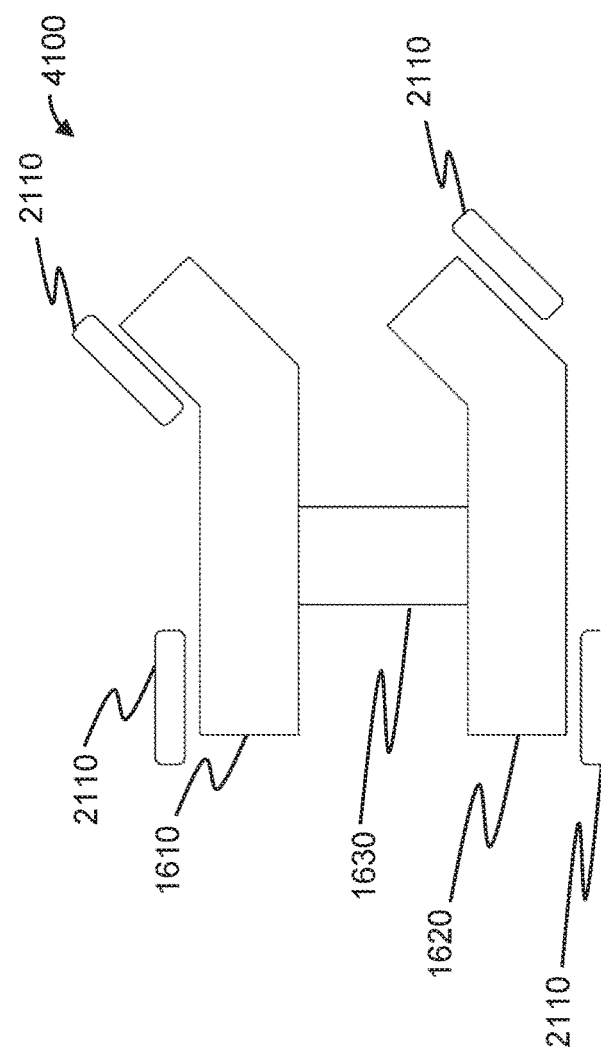

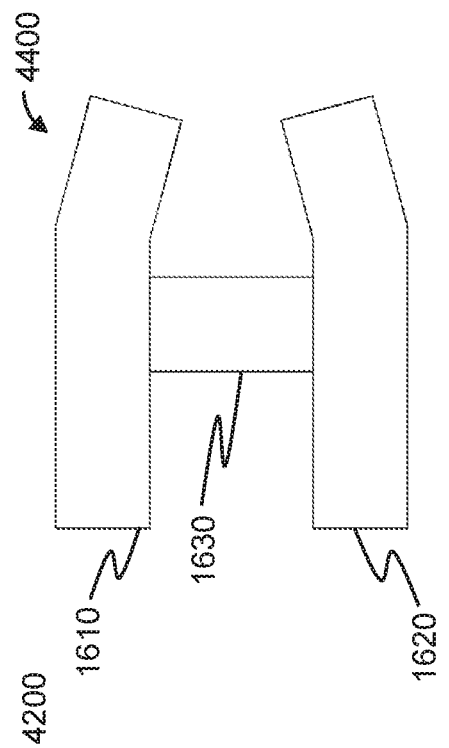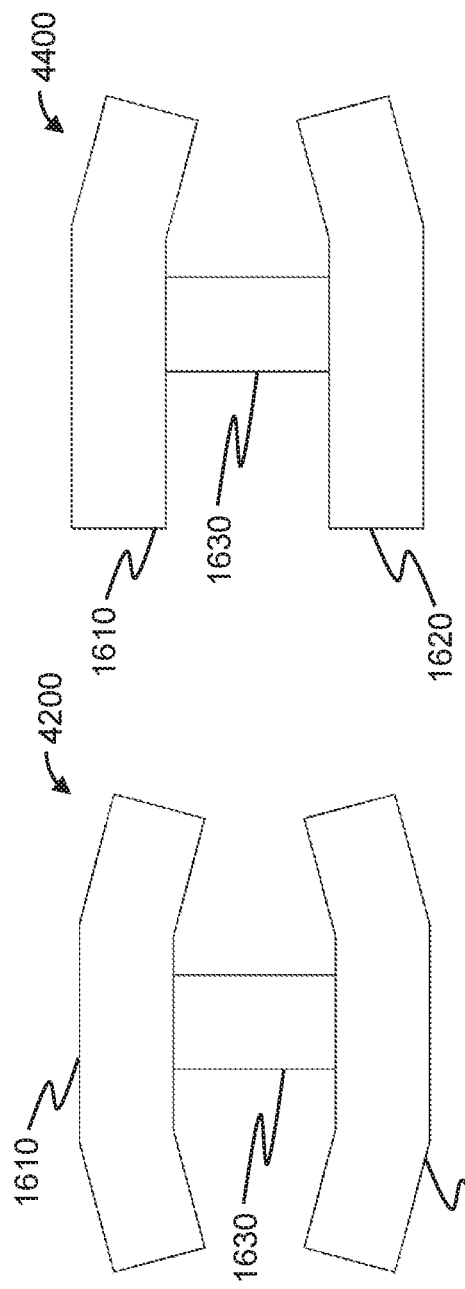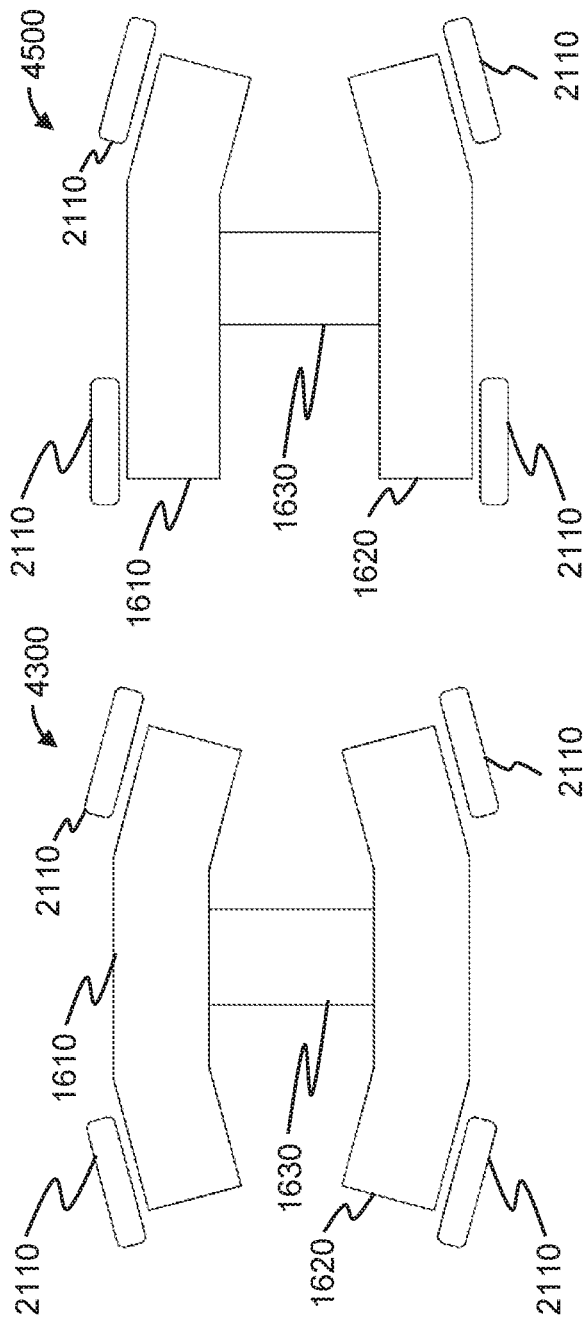

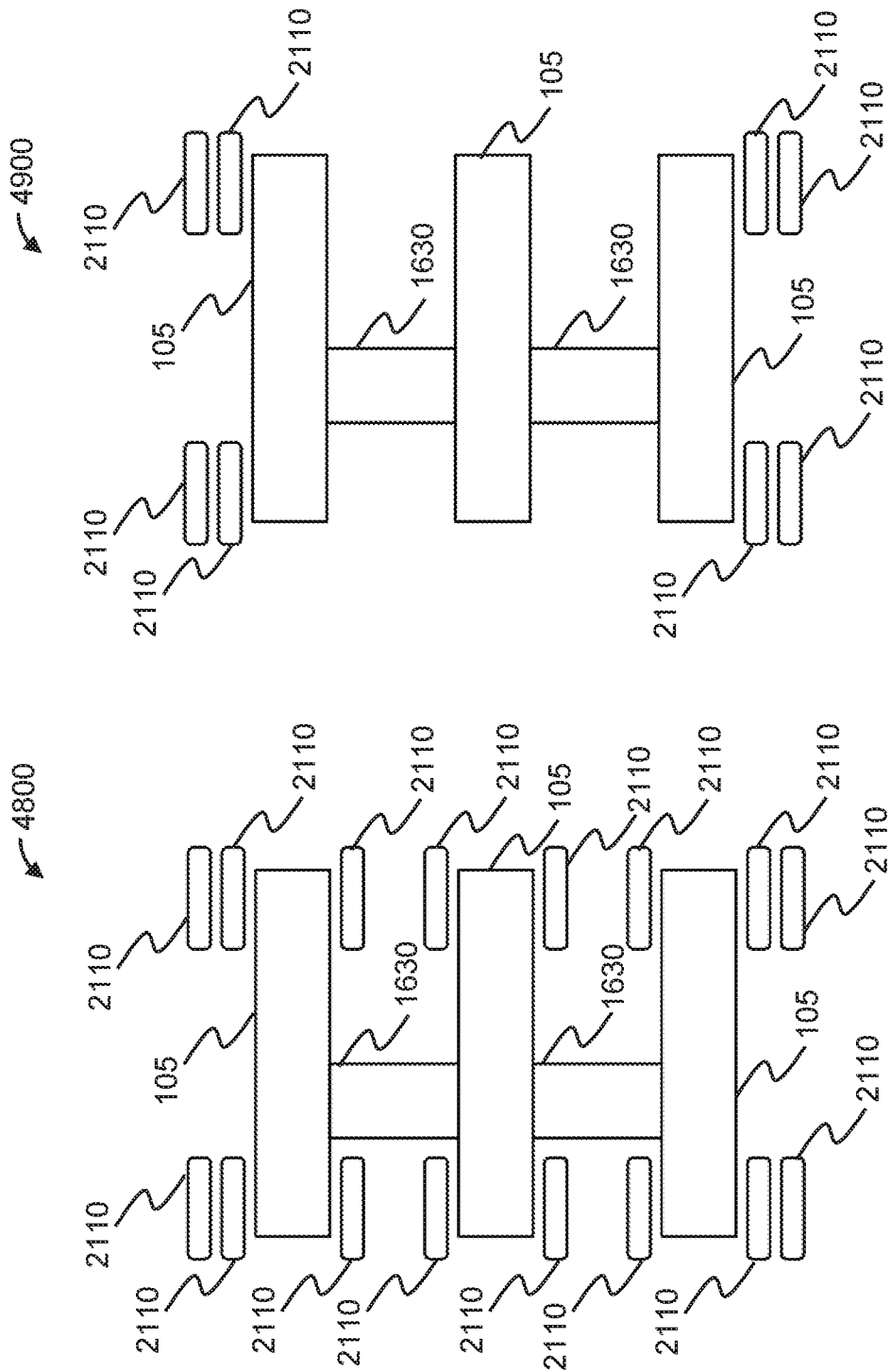

SINGLY STEERABLE, SERPENTINE STEEL TRACK CRAWLER TRANSFORMABLE INTO MULTI-TRACK CRAWLER AND WHEELED VEHICLE

TECHNICAL FIELD

The following relates generally to crawler track vehicles, and more particularly, to steerable crawler track-type tractors having a single track.

BACKGROUND

Today, there are two types of tractors—rubber tire (wheel) and crawler track. Further, crawler track tractors can have either steel tracks or rubber tracks. Rubber tire tractors usually have large rear tires, resulting in a wider vehicle footprint, such as over 3 feet. Steel or rubber track crawlers have two, side-by-side, parallel tracks that also result in a wider vehicle footprint, also possibly over 3 feet.

These tractors are primarily used in agriculture and earthmoving applications. Several field operations have the need for narrow width tractors. In agricultural applications, narrow spaces within rows of standing crops, for example in vineyards, need to be accessed by tractors that draw an implement like a plough or a cultivator; hence, they require high tractive pull within a narrow width. Similarly, earthmoving applications in reduced access areas, like telephony cables lying in urban lanes, require a narrow footprint tractor with significant tractive pull.

When comparing tractive efficiency of different types of tractors, though steel track crawlers offer high traction and low ground pressure as compared to rubber tires or track types, they are generally not used on asphalt (e.g., paved) roads, as they destroy the road surface. Rubber tire or rubber track vehicles offer on-road transportation but have significantly lower tractive efficiency off-road as compared to steel track crawlers.

The following disclosure obviates or mitigates at least one of the foregoing conditions.

SUMMARY

In an aspect, there is provided a crawler vehicle comprising: a first chassis; a power pack disposed in the first chassis; a first sprocket set rotatably coupled to the first chassis and connected to the power pack to drive the first sprocket set along a direction of travel; a first fulcrum pivotally coupled to the first chassis along the direction of travel; a first idler set coupled to the first fulcrum; and a first crawler track comprising a plurality of slats linked end to end to form a continuous track, each slat being pivotally coupled to its neighbouring slats to permit horizontal and vertical movement therebetween, the first crawler track being disposable around the first sprocket set and the first idler set.

In a particular case, the crawler vehicle further comprises a control system in communication with the power pack for controlling speed and steering of the crawler vehicle.

In a further case, the first crawler track further comprises one or more central blocks to which connecting pins are fastened.

In another case, the first chassis is fitted with a vertical guide idler set and a horizontal guide idler set that are operably connected to the first crawler track.

In yet another case, the first sprocket set and the first idler set are controllable to turn in a same direction to cause the first crawler track to traverse in a serpentine manner.

In yet another case, the first idler set is steerable about the first fulcrum.

In yet another case, the first sprocket set is steerable about the first fulcrum.

In yet another case, the first sprocket set and the first idler set control steering of the crawler vehicle by turning in left and right directions about the first fulcrum.

In yet another case, the first sprocket set and the first idler set control steering of the crawler vehicle by turning in varying steering angles.

In yet another case, the crawler vehicle further comprises a first connecting member fastened to the first chassis for attaching to a second connecting member.

In yet another case, the crawler vehicle further comprises: a second chassis; a second sprocket set rotatably coupled to the second chassis and connected to the power pack to drive the second sprocket set along the direction of travel; a second fulcrum pivotally coupled to the second chassis along the direction of travel; a second idler set coupled to the second fulcrum; a second crawler track comprising a plurality of slats linked end to end to form a continuous track, each slat being pivotally coupled to its neighbouring slats to permit horizontal and vertical movement therebetween, the second crawler track being disposable around the second sprocket set and the second idler set; and the second connecting member fastened to the second chassis for attaching to the first connecting member.

In yet another case, the crawler vehicle further comprises a control system in communication with the power pack for controlling speed and steering of the crawler vehicle.

In yet another case, the crawler vehicle further comprises: four wheel hub sets, a first two of the four wheel hub sets attaching a first two tires to the first sprocket set, and a second two of the four wheel hub sets attaching a second two tires to the first idler set.

In yet another case, the first two tires and the second two tires comprise rubber.

In yet another case, at least one of the first sprocket set and the first idler set rests on ground.

In yet another case, at least one of the first sprocket set and the first idler set is above ground.

In yet another case, the crawler vehicle further comprises: four wheel hub sets comprising a first wheel hub set, a second wheel hub set, a third wheel hub set, and a fourth wheel hub set, the first wheel hub set attaching a first tire to the first sprocket set, the second wheel hub set attaching a second tire to the second sprocket set, the third wheel hub set attaching a third tire to the first idler set, and the fourth wheel hub set attaching a fourth tire to the second idler set.

In yet another case, the first tire, the second tire, the third tire, and the fourth tire comprise rubber.

In yet another case, the control system steers the crawler vehicle by applying at least one of differential speed and differential direction steering to the first crawler track and the second crawler track.

In yet another case, the control system steers the crawler vehicle by turning at least one of the first idler set and the first sprocket set in a left or right direction.

In yet another case, the control system steers the crawler vehicle by turning at least one of the first idler set and the first sprocket set in an inward direction.

In yet another case, the first connecting members is a male connecting member and the second connecting member is a female connecting member.

In yet another case, the crawler vehicle further comprises a hitch attached to at least one of a front and rear of the first chassis.

In yet another case, the crawler vehicle further comprises a hitch attached to at least one of a front and rear of at least one of the first connecting member and the second connecting member.

In yet another case, the hitch is rotatable such that the hitch can be pressed on a ground to lift the crawler track to at least a height of a wheel.

In another aspect, there is provided a steerable track for a crawler vehicle, the steerable track comprising: a plurality of slats linked end to end to form a continuous track, each slat being pivotally connected along a vertical axis to a first link at a first end, and pivotally connected along a horizontal axis to a second link at a second end, wherein the first link provides a pivotal engagement along the horizontal axis to a first neighbouring slat and the second link provides a pivotal engagement along the vertical axis to a second neighbouring slat.

In a particular case, each pivotal engagement is provided by connecting pins disposed through the slats and the links.

BRIEF DESCRIPTION OF THE DRAWINGS

A greater understanding of the embodiments will be had with reference to the figures, in which:

FIG. 4 illustrates a top view of a singular steering arrangement of a single crawler track steering in a right direction, according to an embodiment.

FIG. 5 illustrates a front view of a portion of the crawler track of FIG. 4.

FIG. 6 illustrates a top view of a portion of the crawler track of FIG. 4.

FIG. 9 illustrates a front view of a horizontal and vertical idler guiding system, according to an embodiment.

FIG. 10 illustrates a top view of the horizontal and vertical idler guiding system of FIG. 9.

FIG. 17 illustrates a top view of a connecting member system, according to an embodiment.

FIG. 18 illustrates a first perspective view of the connecting member system of FIG. 17.

FIG. 19 illustrates a second perspective view of the connecting member system of FIG. 17.

FIG. 20 illustrates a third perspective view of the connecting member system of FIG. 17.

FIG. 24 illustrates a front view of a front and rear hitch equipped multi-track crawler vehicle, according to an embodiment.

FIG. 25 illustrates a top view of the front and rear hitch equipped multi-track crawler vehicle of FIG. 24.

FIG. 26 illustrates a perspective view of the front and rear hitch equipped multi-track crawler vehicle of FIG. 24.

FIG. 29 illustrates a front view of a central block, according to an embodiment.

FIG. 30 illustrates a side view of the central block of FIG. 29.

FIG. 31 illustrates a top view of the central block of FIG. 29.

FIG. 32 illustrates a perspective view of the central block of FIG. 29.

FIG. 34 illustrates a perspective view of a multi-steering arrangement of a single-track crawler vehicle, according to an embodiment.

FIG. 35 illustrates a top view of the multi-steering arrangement of FIG. 34.

FIG. 40 illustrates a block diagram of a top view of front steering of a multi-track crawler vehicle, according to an embodiment.

FIG. 41 illustrates a block diagram of a top view of front steering of a multi-track crawler vehicle fitted with rubber tires, according to an embodiment.

FIG. 42 illustrates a block diagram of a top view of front and rear inward steering of a multi-track crawler vehicle, according to an embodiment.

FIG. 43 illustrates a block diagram of a top view of front and rear inward steering of a multi-track crawler vehicle fitted with rubber tires, according to an embodiment.

FIG. 44 illustrates a block diagram of a top view of front inward steering of a multi-track crawler vehicle, according to an embodiment.

FIG. 45 illustrates a block diagram of a top view of front inward steering of a multi-track crawler vehicle fitted with rubber tires, according to an embodiment.

FIG. 48 illustrates a block diagram of a top view of a multi-track crawler vehicle fitted with sixteen rubber tires, according to an embodiment.

FIG. 49 illustrates a block diagram of a top view of a multi-track crawler vehicle fitted with eight rubber tires, according to an embodiment.

DETAILED DESCRIPTION

Figure 1:
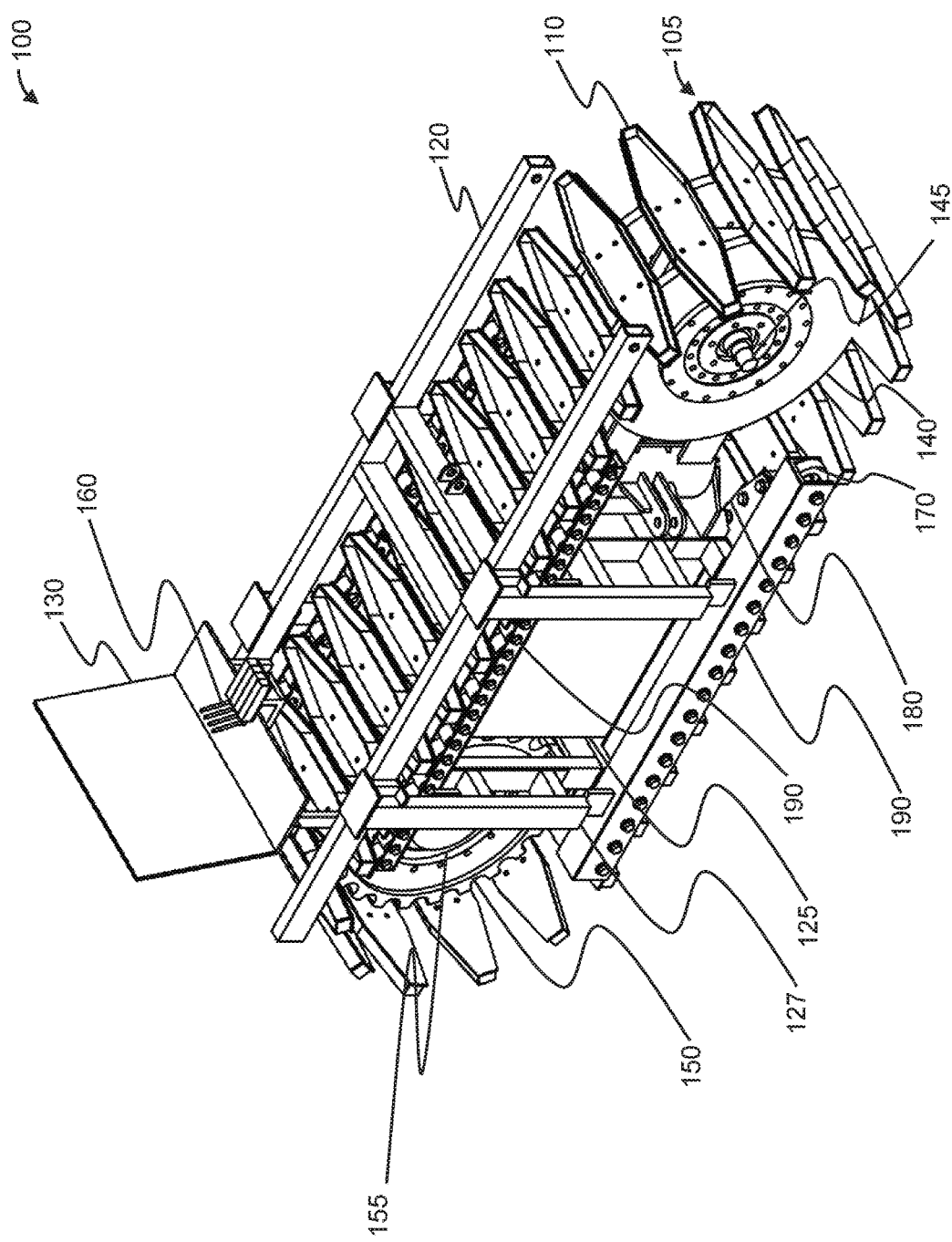
FIG. 1 illustrates a perspective view of a single-track crawler vehicle, according to an embodiment.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

The present disclosure provides a high tractive efficiency, narrow footprint, steel track crawler tractor, and methods of use thereof. Advantageously, embodiments of the disclosed tractor provide a singly steerable, serpentine steel track crawler tractor for demanding tractive applications in narrow access areas. Further, embodiments of the disclosed tractor provide the ability to ply over paved roads by means of easily attachable rubber tires. The tractor is thereby highly versatile in off-road and on-road environments, as well as in narrow and wide area applications.

The inter-conversion between the steel track crawler and rubber tire vehicles is easy and quick, with minimal changeover of elements involved in the process. It will be appreciated that although the embodiments described herein refer to steel track crawlers, other suitable materials known in the art for track crawlers are contemplated, such as aluminum, rubber, or a combination or steel and rubber. Also, it will be appreciated that although the embodiments described herein refer to rubber tires, other suitable materials known in the art for tires are contemplated, such as steel reinforced rubber, solid rubber, air-inflated rubber, or metal tires used in construction and road paving applications.

Conventional crawler tractors have been in existence for over a century. They typically have two crawler tracks arranged side by side. This increases the width of the tractor, hence limiting its usage in narrow inter-crop rows in agriculture and narrow urban lanes.

There have been attempts to create a single steerable steel crawler track, but they have generally failed due to cumbersome, if not impossible, steering mechanisms. Also, there have been attempts to steer a single flexible rubber track, but they are generally rendered ineffective due to lower traction and high slippage compared to steel crawlers, and also reduced life due to steering of the track. Embodiments described herein provide a solution to the above problems by allowing a single steel crawler track to steer utilizing two degrees of freedom for chain links. These two degrees of freedom let the chain links steer the crawler track about idler sets and/or sprocket sets. This results in a single crawler track that can steer and navigate through narrow access areas. As described, the front wheel guides the vehicle through a turn, although embodiments are contemplated wherein the rear wheel is steered.

Inter-crop operations in agriculture are frequently performed using small rotary tillers that can access narrow spaces in crop rows. But these tillers are not useful for open field (no crop) operations like ploughing. Hence, a farmer needs to employ a large tractor for these demanding traction applications. For small-scale farmers, especially in developing countries, this is a financial and operational burden. Embodiments described herein provide a solution by providing means to connect two single crawler tracks, thus forming a dual crawler tractor for open field operations such as ploughing. Also, the higher width of dual tracks means the tractor can be used in slopes and hilly terrain. The farmer can use one vehicle for inter-crop and open-field operations.

Conventional crawler tractors have to be loaded and hauled in a truck or a tractor trailer. They are not easy to move from one field to another field for farming or earth-moving operations. Rubber track crawlers do ply on roads, but they are inefficient in the field compared to steel crawler tractors. Embodiments described herein provide a solution by providing a quick and easy means to attach rubber tires to the crawler tracks. This does not need complex mechanical transmission elements and can be achieved within minutes. With rubber tires, the crawler tractor can ply on a road, be driven from site to site on its own without the need for a truck, and haul loads on the tractor as well as using a trailer.

Steering of conventional crawler tractors or skid steers is achieved by differential speed or direction steering where the tracks or wheels skid to turn. Skidding increases wear and tear of mechanical components and rubber tires, hence reducing life. Embodiments described herein provide a solution by allowing multiple combinations of steering arrangements including front and rear steering, inward steering, and differential speed and direction steering. These arrangements reduce skid and slippage, thus reducing stress and wear and tear on components.

The annual utilization of heavy machinery for open field operations in farming is quite low. For example, in tropical climates, where crops are grown in three or four seasons, the number of days the field is open (i.e., without crop) is less than 60 days a year. For these open field operations like ploughing, the farmer has to employ a heavy tractor that usually remains idle for the rest of the year during inter-crop operations. Especially in developing countries, a small-scale farmer or earth moving operator finds it difficult to purchase and operate heavy machinery for low utilization. Embodiments described herein provide a more economical product, in that it provides a realistic solution to split the cost between multiple operators. For example, two operators can each purchase an independent single-track crawler tractor. Each single track can be used by them independently for a narrow access operation. When the need for open field operations arises, the two single-track crawler tractors can be combined into a dual-track crawler for use by both farmers. This brings cost savings to small operators engaged in farming and earth moving.

Normally, narrow vehicles have an inherent issue of stability. Embodiments described herein lower the center of gravity by fitting all elements of the tractor, including the engine, power pack, idlers, and sprockets, very close to the ground. This results in higher stability despite narrow width. This also results in the ability to convert to wider dual crawler tracks or rubber tires, giving the option to the operator to increase width in steep or difficult terrain.

Referring now to FIG. 1, a single-track crawler vehicle 100, according to an embodiment, is shown. In a particular case, the single-track crawler vehicle 100 is a singly steerable, serpentine, steel crawler track vehicle. The single-track crawler vehicle 100 has a continuous, endless steel crawler track 105. The crawler track 105 is driven by a sprocket set 150 at the rear of the single-track crawler vehicle 100 and is guided by a front idler set 140 at the front of the single-track crawler vehicle 100.

The single-track crawler vehicle 100 has a chassis 120 that can be fitted with a vertical guide idler set 190 on the top and bottom on the left and right side to guide the crawler track 105 while in motion. The chassis 120 can be fitted with a horizontal guide idler set 180 on the top and bottom on the left and right side to guide the crawler track 105 while in motion and during steering.

In an embodiment, the sprocket set 150 is directly mounted over a hydraulic motor gearbox 155. The hydraulic motor gearbox 155 provides rotary motion for the sprocket set 150 about its horizontal axis. The hydraulic motor gearbox 155 is affixed to the chassis 120 using fasteners. In an embodiment, the hydraulic motor gearbox 155 may comprise a hydraulic motor, a planetary gearbox, and a housing to mount the sprocket set 150.

Figure 7:
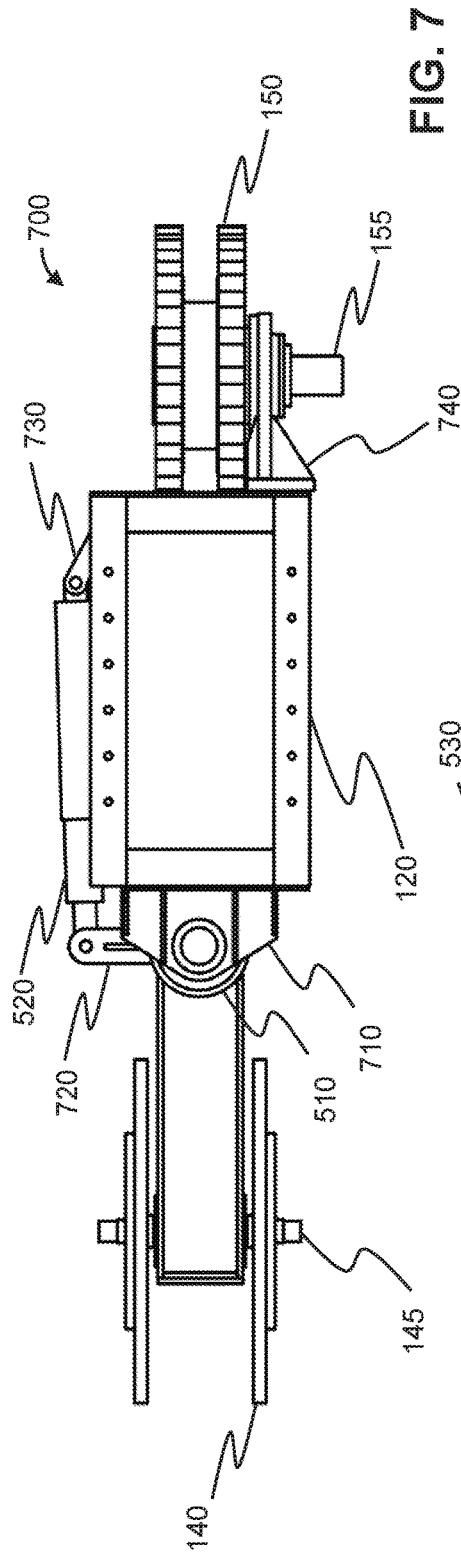
FIG. 7 illustrates a top view of a steering mechanism of a single-track crawler vehicle, according to an embodiment.

In an embodiment, the front idler set 140 is mounted over a front axle 145. The front axle 145 may be affixed to the fulcrum 510 (as shown in FIG. 7) using bearings and a bearing housing. In an embodiment, the front idler set 140 and the front axle 145 are not power driven; i.e., they move freely about the bearings.

Figure 2:
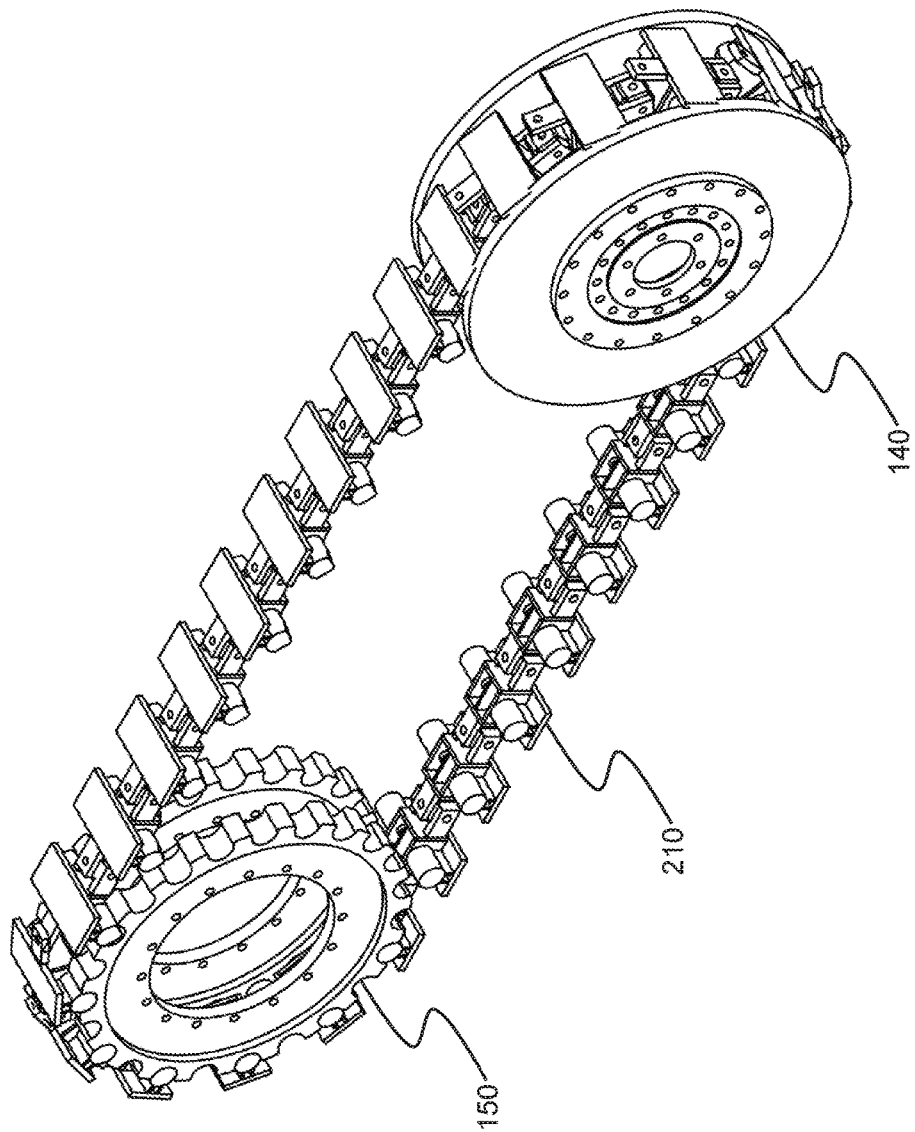
FIG. 2 illustrates a perspective view of a single continuous, endless chain formed with chain links, according to an embodiment.
Figure 3:
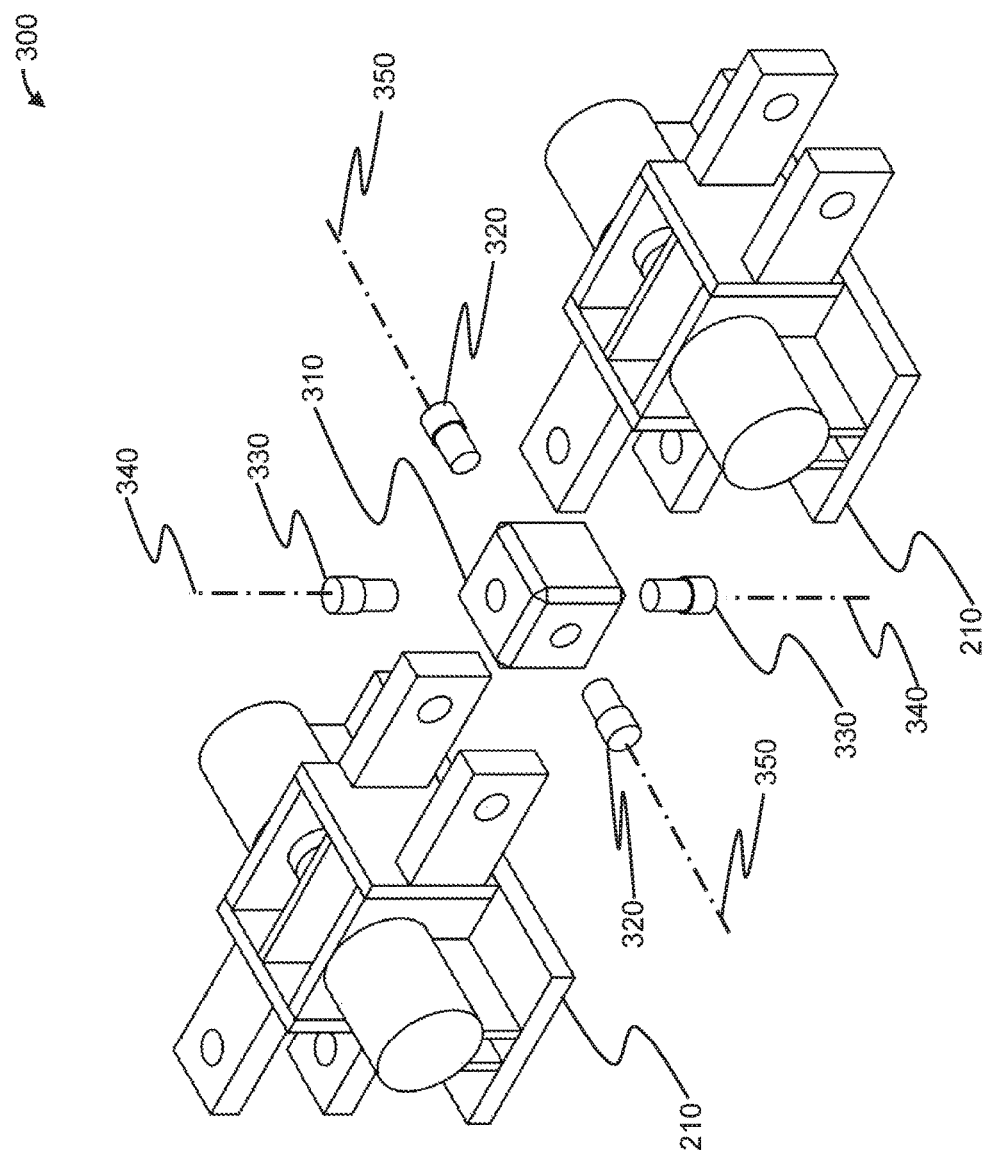
FIG. 3 illustrates an exploded view of a central block chain link connection system, according to an embodiment.

The crawler track 105 is a continuous, endless track of crawler slats 110 that may be connected by chain links 210 (as shown in FIG. 2) via a central block 310 and connecting pins 320 (as shown in FIG. 3), as explained more fully below.

The chassis 120 of the single-track crawler vehicle 100 is fitted with a power pack 125, which may include, but is not limited to, an engine, a motor, a hydraulic pump, and a hydraulic power pack. The engine of the power pack 125 provides power (e.g., hydraulic power) to the single-track crawler vehicle 100 for motion, steering, and other operations, such as, but not limited to, lifting implements and driving a power take-off shaft. The sprocket set 150 is rotatably coupled to the chassis 120 and connected to the power pack 125 to drive the sprocket set 150 along a direction of travel. In various embodiments, the power pack 125 can be driven by electricity, diesel, gasoline, or similar means of providing power.

In an embodiment, the forward and reverse movement is accomplished with a hydraulic motor gearbox 155, conventionally described as a "hydrostatic drive", which propels the sprocket set 150 at the rear of the single-track crawler vehicle 100. The sprocket set 150 propels the crawler track 105 along the ground.

The chassis 120 may be fitted with an operator seat 130. The vehicle operator sits on the operator seat 130 and makes use of a hydraulic control valve set 160 to control the hydraulic functions including, but not limited to, the hydraulic motor gearbox 155 for forward and reverse movement of the single-track crawler vehicle 100, steering, implement lifting, and power take-off. In various embodiments, the hydraulic power from the power pack 125 is transferred via flexible hydraulic hoses and/or hydraulic pipes to the hydraulic control valve set 160. In an embodiment, one end of one or more flexible hydraulic hoses and/or hydraulic pipes is connected to the hydraulic pump of the power pack 125 and the other end is connected to the valves of the hydraulic control valve set 160. In an embodiment, the flexible hydraulic hoses and/or hydraulic pipes are clamped to fixed members of the chassis 120, such as a vertical bar 127, so that they can stay clear of the moving parts, such as the crawler slats 110.

FIG. 2 illustrates a perspective view of a single continuous, endless chain 200 formed with chain links, according to an embodiment. Chain links 210 wrap over the sprocket set 150 and front idler set 140. The sprocket set 150 comprises a pair of sprockets arranged side by side. The front idler set 140 has a pair of idlers arranged side by side.

In an embodiment, the pair of sprockets of the sprocket set 150 at the rear are mounted side by side so as to have the round portion of the chain links 210 sit between the sprocket teeth and the middle of the chain links 210 pass through the gap between the pair of sprockets. The middle portion of the chain links 210 (as shown in FIG. 3) acts as a guide for aligning chain links 210 while wrapping around the pair of sprockets of the sprocket set 150.

In an embodiment, the pair of idlers of the front idler set 140 are mounted side by side so as to have the chain links 210 sit between the idlers. The crawler slats 110 are mounted on the chain links 210 (as shown in FIGS. 5 and 6). The crawler slats 110 pass over the front idler set 140 while the chain links 210 sit between the front idler set 140, acting as a guide for aligning chain links 210 while wrapping around the pair of idlers of the front idler set 140. As shown in FIG. 2, the chain links 210 pass through a pair of front idlers of the front idler set 140 while the crawler slats 110 rest on the outer surface of the front idler set 140 serving as a guide. The chain can be given sufficient tension by means of a mechanical spring or hydraulic actuator.

The orientation of the continuous, endless chain 200 in FIG. 2 provides an example where the single-track crawler vehicle 100 moves in a straight direction as the front idler set 140 and sprocket set 150 are aligned with each other. In this orientation, the single-track crawler vehicle 100 can move in the forward or reverse direction.

The front idler set 140 may comprise one or more idlers. The sprocket set 150 may comprise one or more sprockets. In an embodiment, the front idler set 140 comprises one idler while the sprocket set 150 comprises two similarly constructed sprockets.

FIG. 3 illustrates an exploded view of a central block chain link connection system 300, according to an embodiment. Two chain links 210 are connected via a central block 310 and four connecting pins 320 and 330 to form a continuous, endless chain 200. The connecting pins 320 and 330 can have external threading that can be fastened into internal threading of the holes in central block 310. The heads of connecting pins 320 and 330 fit into the round holes of wings of chain links 310 holding them in place as well as connecting them to the central block 310.

The chain links 210 shown in FIG. 3 have at least two axes of freedom: the vertical axis 340 about vertical connecting pins 330 and the horizontal axis 350 about horizontal connecting pins 320 connected via the central block 310. The left chain link 210 can rotate about the central block 310 along the horizontal axis 350 of horizontal connecting pins 320. The right chain link 210 can rotate about the central block 310 along the vertical axis 340 of vertical connecting pins 320. These at least two degrees of freedom allow the single-track crawler vehicle 100 to steer left or right, while the continuous, endless chain 200 wraps around the sprocket set 150 and front idler set 140.

Advantageously, the horizontal axis 350 of freedom allows the chain links to wrap around the sprocket set 150 and front idler set 140. The vertical axis 340 of freedom allows the left chain link 210 to steer with respect to the right chain link 210.

In conventional crawler tractors, the chain links of crawler tracks have only one degree of freedom via the horizontal axis to wrap around sprockets and idlers. The chain links are constrained, i.e., do not have a second degree of freedom about the vertical axis.

FIG. 4 illustrates a top view of a singular steering arrangement of a single crawler track 105 steering in a right direction, according to an embodiment. When the front idler set 140 rotates towards the right (clockwise) about its vertical axis 530 (as shown in FIG. 7), the chain links 210, that fit within the pair of front idlers of the front idler set 140 (as shown in FIG. 2), also steer towards the right. The crawler slats 110 attached to the chain links 210 as shown in FIG. 5 are also steered towards the right. Hence, the crawler slats 110 as shown in FIG. 4 steer towards the right.

This is a "singular steering" arrangement where only the front idler set 140 is used to steer the single-track crawler vehicle 100. This singular steering mechanism allows the crawler track 105 of the single-track crawler vehicle 100 to steer in either the right or left direction. The single-track crawler vehicle 100 can steer while in a forward or rear direction of motion.

The crawler slats 110 shown in FIGS. 1 and 4, which form a part of the crawler track 105, rest on the ground and propel the single-track crawler vehicle 100 in a forward or reverse direction, while also providing traction and steering.

FIG. 5 illustrates a front view of a portion of the crawler track 105 of FIG. 4. Two chain links 210 are connected to crawler slats 110. The crawler slats 110 fit on the outside of the chain links 210, i.e., towards the ground side of the chain links. In various embodiments, the crawler slats 110 can be welded or fastened to the chain links 210 or cast in one piece with the chain links 210. In an embodiment, every chain link 210 is attached to at least a crawler slat 110 by means of fasteners. The crawler slats 110 rest on the ground while the chain links 210 provide propulsion from the sprocket set 150.

FIG. 6 illustrates a top view of a portion of the crawler track 105 of FIG. 4. The crawler slats 110 connected via chain links 210, the central block 310, and connecting pins 320 and 330 form a continuous endless crawler track 105. In an embodiment, the crawler slats 110 have eight sides, with narrowing sides at an angle. This is done to allow the crawler slats 110 to steer about each other without colliding onto its adjacent crawler slats 110. In another embodiment, the crawler slats 110 can be of rectangular shape where a crawler slat 110 slips under its adjacent crawler slat 110 during a turn without colliding with the adjacent crawler slat 110.

Figure 8:
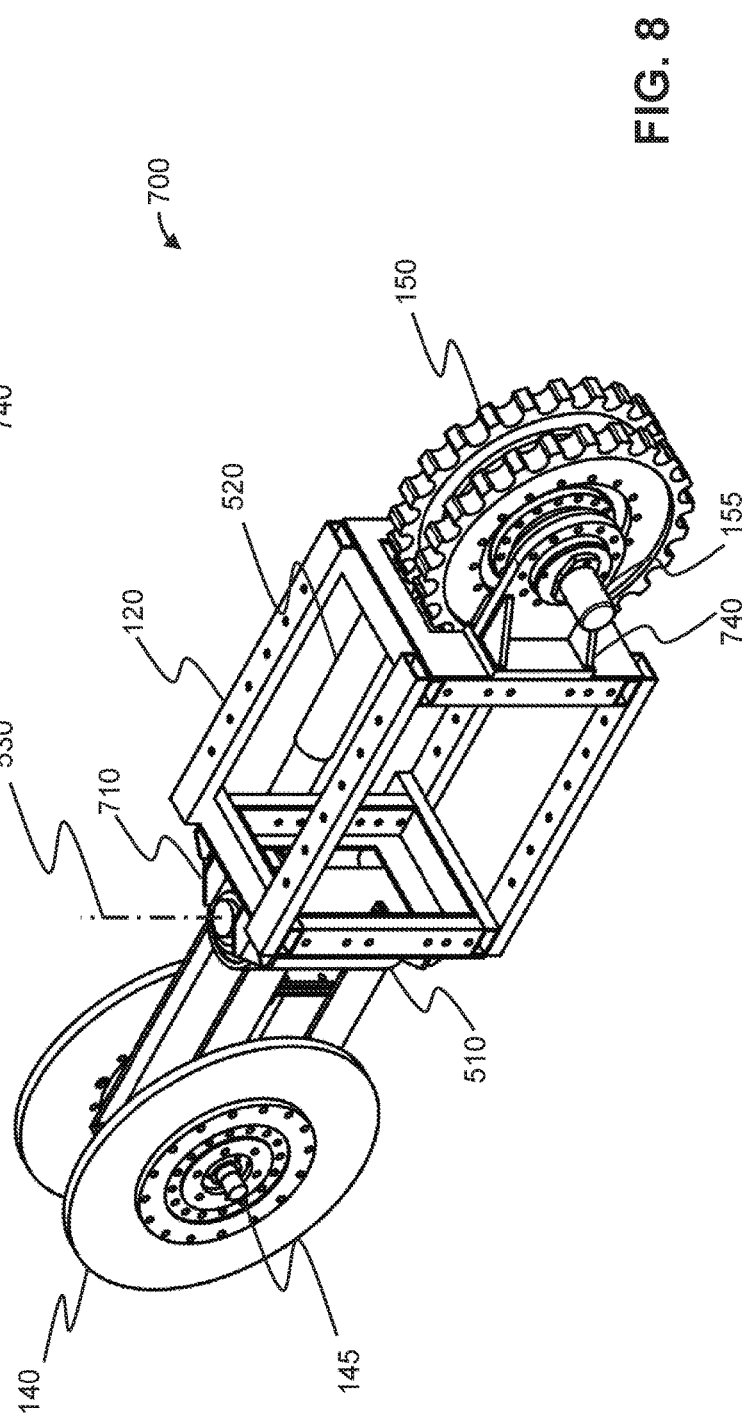
FIG. 8 illustrates a perspective view of the steering mechanism of FIG. 7.

FIG. 7 illustrates a top view of a steering mechanism 700 of a single-track crawler vehicle 100, according to an embodiment. FIG. 8 illustrates a perspective view of the steering mechanism 700 of FIG. 7. The front idler set 140 is steered by means of a hydraulic cylinder mechanism. A fulcrum 510 is fixedly coupled to the front idler set 140. In an embodiment, the front idler set 140 is mounted over a front axle 145. The front axle 145 may be affixed to the fulcrum 510 using bearings and a bearing housing. In an embodiment, the front idler set 140 and the front axle 145 are not power driven; i.e., they move freely about the bearings. The fulcrum 510 is pivotally connected to the chassis 120 using a first bracket 710 and can rotate about its vertical axis 530. The fulcrum 510 is also pivotally connected to a first end of a hydraulic cylinder 520 using a second bracket 720. The other end of the hydraulic cylinder 520 is pivotally connected to the chassis 120 using a third bracket 730. The hydraulic cylinder 520 provides the actuation force for steering the track, by rotating the fulcrum 510 in either the right or left direction about the vertical axis 530. In an embodiment, the operator of the single-track crawler vehicle 100 controls the actuation of the hydraulic cylinder 520 by means of the hydraulic control valve set 160. This steers the front idler set 140 and hence steers the chain links 210, crawler slats 110, and single-track crawler vehicle 100. An example of such steering of the single-track crawler vehicle 100 is illustrated in FIG. 4. In various embodiments, the ports of the hydraulic cylinder 520 are connected to the hydraulic control valve set 160 via flexible hydraulic hoses and/or hydraulic pipes. These flexible hydraulic hoses and/or hydraulic pipes transfer energy by means of pressurized hydraulic fluid from the power pack 125 via the hydraulic control valve set 160 for the actuation of the hydraulic cylinder 520. The flexible hydraulic hoses and/or hydraulic pipes can be connected between the hydraulic control valve set 160 and the ports of the hydraulic cylinder 520 on the same side as where the hydraulic cylinder 520 is connected to the chassis 120 (e.g., at the third bracket 730 as shown in FIG. 7). In an embodiment, the flexible hydraulic hoses and/or hydraulic pipes are clamped to fixed members of the chassis 120 such as a vertical bar 127 (shown in FIG. 1) so that they can stay clear of the moving parts (e.g., the crawler slats 110).

In an embodiment, the sprocket set 150 is directly mounted over a hydraulic motor gearbox 155. The hydraulic motor gearbox 155 provides rotary motion for the sprocket set 150 about its horizontal axis. The hydraulic motor gearbox 155 is affixed to the chassis 120 using a fourth bracket 740 and fasteners. In an embodiment, the hydraulic motor gearbox 155 comprises a hydraulic motor, a planetary gearbox, and a housing to mount the sprocket set 150. In an embodiment, the operator of the single-track crawler vehicle 100 controls the hydraulic motor of the hydraulic motor gearbox 155 by means of the hydraulic control valve set 160. In various embodiments, the ports of hydraulic motor of the hydraulic motor gearbox 155 are connected to the hydraulic control valve set 160 via flexible hydraulic hoses and/or hydraulic pipes. These flexible hydraulic hoses and/or hydraulic pipes transfer energy by means of pressurized hydraulic fluid from the power pack 125 via the hydraulic control valve set 160 for the rotation of the hydraulic motor of the hydraulic motor gearbox 155. The flexible hydraulic hoses and/or hydraulic pipes can be connected between the hydraulic control valve set 160 and the hydraulic motor of the hydraulic motor gearbox 155 on the same side as where the hydraulic motor gearbox 155 is connected to the chassis (e.g., at the fourth bracket 740 as shown in FIG. 7). In an embodiment, the flexible hydraulic hoses and/or hydraulic pipes are clamped to fixed members of the chassis 120 such as a vertical bar 127 (shown in FIG. 1) so that they can stay clear of the moving parts (e.g., the crawler slats 110).

The crawler track 105, and hence the single-track crawler vehicle 100, can steer independently, i.e., without the need for a second, parallel crawler track. This advantageously reduces the width and hence footprint of the single-track crawler vehicle 100, allowing it to traverse through narrow access areas of agricultural and earth-moving applications. As is known in off-road applications, in embodiments the steel crawler track 105 provides higher tractive efficiency over comparable rubber tire or rubber track vehicles. Steel tracks can provide a significant increase in traction over rubber tires or tracks. Rubber on soil gets its traction from friction which comes with slippage, but steel tracks claw into the ground (i.e., do not depend on friction and hence have no slippage).

FIG. 9 illustrates a front view of a horizontal and vertical idler guiding system 900 guiding the crawler track 105 in the direction of travel and steering to the left and right, according to an embodiment. FIG. 10 illustrates a top view of the horizontal and vertical idler guiding system 900 of FIG. 9. In FIGS. 9 and 10, a portion of the crawler track 105 is shown, though not labelled, but can be identified by its constituent crawler slats 110.

The crawler track 105 comprising the chain links 210 passes through a horizontal guide idler arrangement 180. The crawler slats 110 are guided by a vertical guide idler arrangement 190. The vertical guide idler arrangement 190 comprises one or more idlers 170 arranged one behind the other to guide the crawler slats 110 along the ground and also to spread the weight of the vehicle over the ground. The horizontal guide idler arrangement 180 comprises idler rollers 1010 that act as a guide for the chain links 210, and hence crawler slats 110, in the direction of travel and also while steering left or right between the front idler set 140 and sprocket set 150.

In FIGS. 9 and 10, only the bottom horizontal guide idler arrangement 180 and the vertical guide idler arrangement 190 have been illustrated for simplicity. In various embodiments, a same or similar arrangement for guiding the crawler track 105 is provided at the top and bottom of the crawler track 105.

These horizontal 180 and vertical 190 idler arrangements function to guide and stabilize the crawler track 105 as well as direct the crawler track 105 along the path between the sprocket set 150 and front idler set 140. In addition, the vertical guide idler arrangement 190 assists in spreading the vehicle weight uniformly over the bottom crawler slats 110 resting on the ground.

Figure 12:
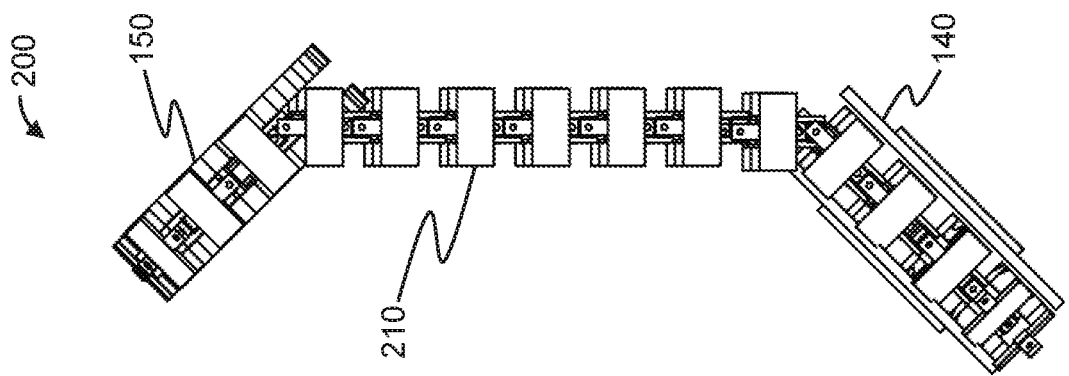
FIG. 12 illustrates a top view of the dual steering arrangement of FIG. 11.
Figure 11:
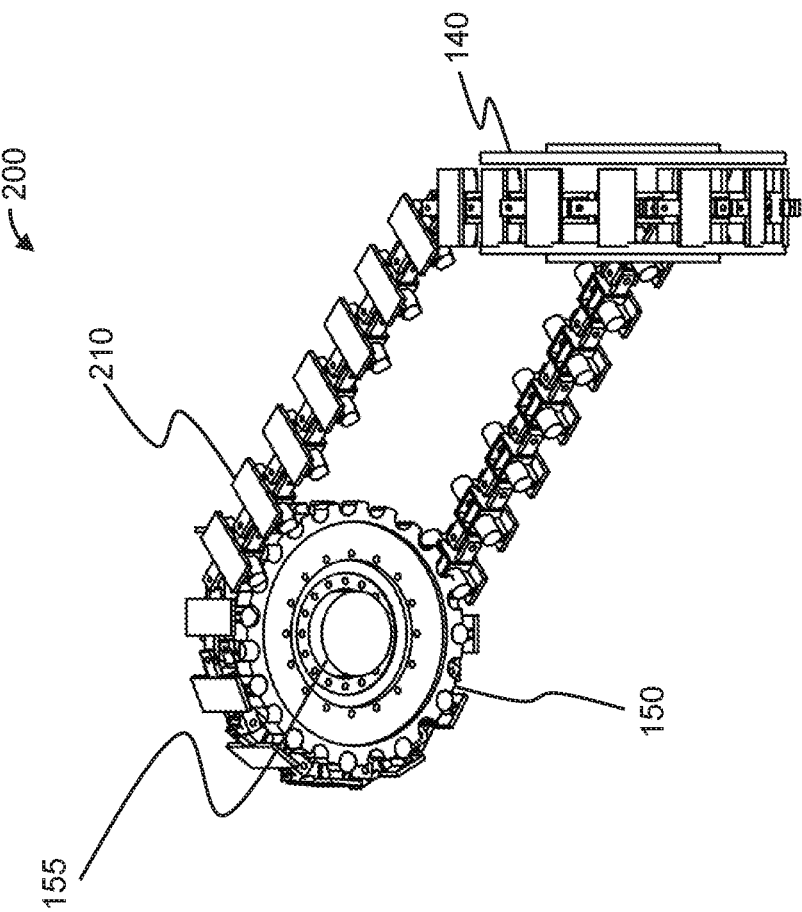
FIG. 11 illustrates a perspective view of a dual steering arrangement of a continuous, endless chain steering in a right direction, according to an embodiment.

FIG. 11 illustrates a perspective view of a dual steering arrangement of a continuous, endless chain 200 steering in a right direction, according to an embodiment. FIG. 12 illustrates a top view of the dual steering arrangement of the continuous, endless chain 200 of FIG. 11. As shown in FIGS. 11 and 12, for the continuous, endless chain 200 to steer in the right direction, the rear sprocket set 150 rotates in the counter-clockwise direction, and the front idler set 140 rotates in the clockwise direction as seen from the top.

The dual steering arrangement of the continuous, endless chain 200 steers the crawler track 105, and hence the single-track crawler vehicle 100. As shown in the FIGS. 11 and 12, the sprocket set 150 also steers in the opposite direction along with the front idler set 140. The sprocket set 150 steers the single-track crawler vehicle 100 in the same direction as the front idler set 140. The advantage of this "dual" steering arrangement is that the single-track crawler vehicle 100 turns in a shorter turning radius as compared to the "singular" steering arrangement illustrated in FIG. 4.

In an embodiment, a second set of an independent fulcrum 510 and hydraulic cylinders 520 as shown in FIGS. 7 and 8 are used to steer the sprocket set 150 about its vertical axis 530.

Figure 13:
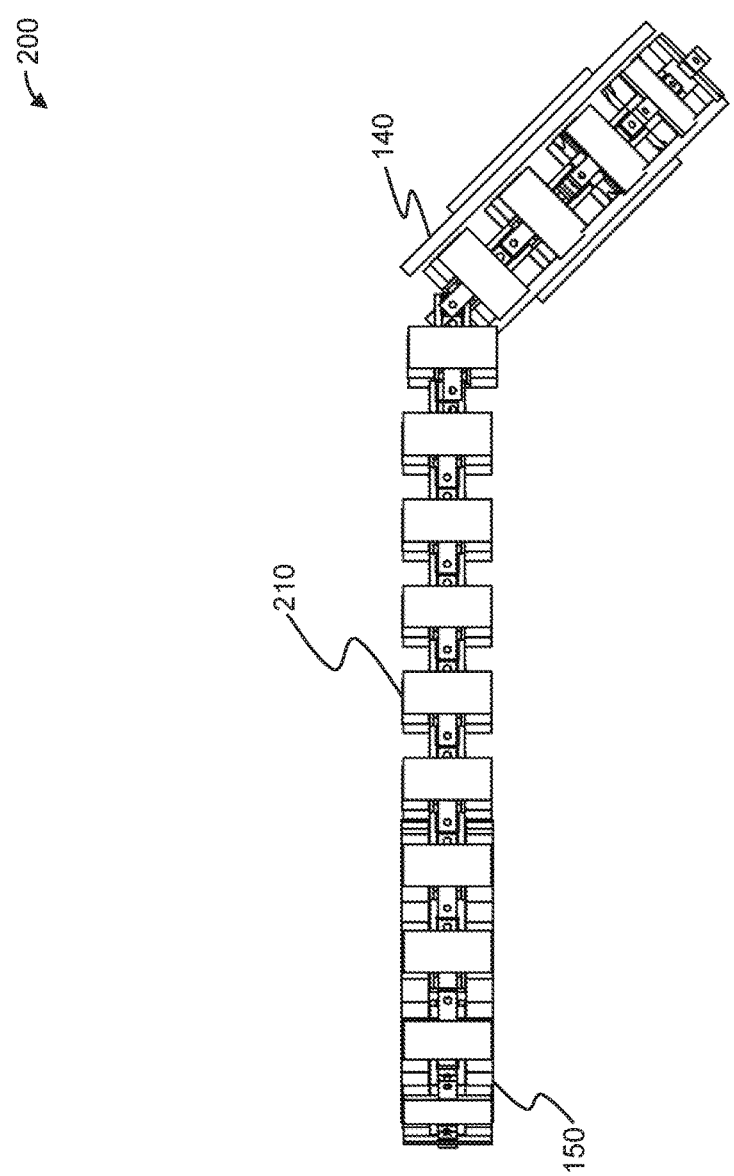
FIG. 13 illustrates a top view of a singular steering arrangement of a continuous, endless chain steering in a right direction, according to an embodiment.

FIG. 13 illustrates a top view of a singular steering arrangement of a continuous, endless chain 200 steering in the right direction, according to an embodiment. Similar to FIG. 4, this is a "singular" steering arrangement where only the front idler set 140 steers the single-track crawler vehicle 100 towards the right or left. The sprocket set 150 remains aligned to the direction of travel of the single-track crawler vehicle 100 in this arrangement.

Figure 14:
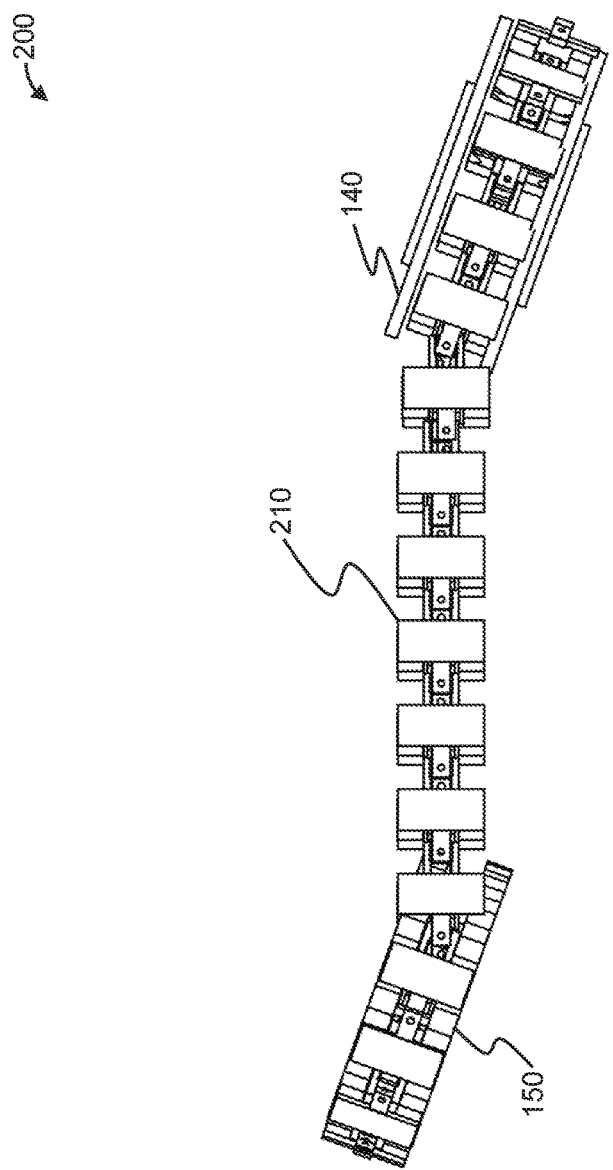
FIG. 14 illustrates a top view of a continuous, endless chain moving in a serpentine manner, according to an embodiment.

FIG. 14 illustrates a top view of a continuous, endless chain 200 moving in a serpentine manner, according to an embodiment. The rear sprocket set 150 and the front idler set 140 turn in the same direction with each other, i.e., clockwise as shown in FIG. 14. The sprocket set 150 and the front idler set 140 are steered in a such a manner that they are parallel to each other, while the chain links 210 connect them in a continuous endless crawler track 105. Advantageously, this serpentine fashion allows the single-track crawler vehicle 100 to come out of tight corners and narrow spaces without having to take a partial or full turn. The serpentine traversal and steering ability of the crawler track 105 makes it very maneuverable in tight spaces. In various embodiments, the sprocket set 150 and the front idler set 140 may be nonparallel, yet still be turned in the same direction with each other (e.g., clockwise as in FIG. 14), but to varying degrees, while still causing the crawler track 105 to traverse in a serpentine manner. Traversing in a serpentine manner may cause the middle straight portion of the crawler track 105 to skid so that the single-track crawler vehicle 100 can come out of a tight space without having to take a partial or full turn.

FIGS. 4 and 9-14 show a continuous, endless chain 200 steering in the right direction. The front idler set 140 and/or the sprocket set 150, chain links 210, and crawler slats 110 can be steered in the left or right direction, hence allowing the single-track crawler vehicle 100 to steer with a single continuous, endless crawler track 105.

Advantageously, this steering arrangement provides the means to steer a single-track crawler vehicle 100 and traverse in a serpentine fashion. In comparison, a conventional crawler type vehicle has two crawler tracks in a side-by-side parallel arrangement, which are steered by differing the speed and/or direction of one track vis-a-vis the other track. Such a two crawler track vehicle is significantly wider, hence restricting its application in narrow width access.

Figure 15:
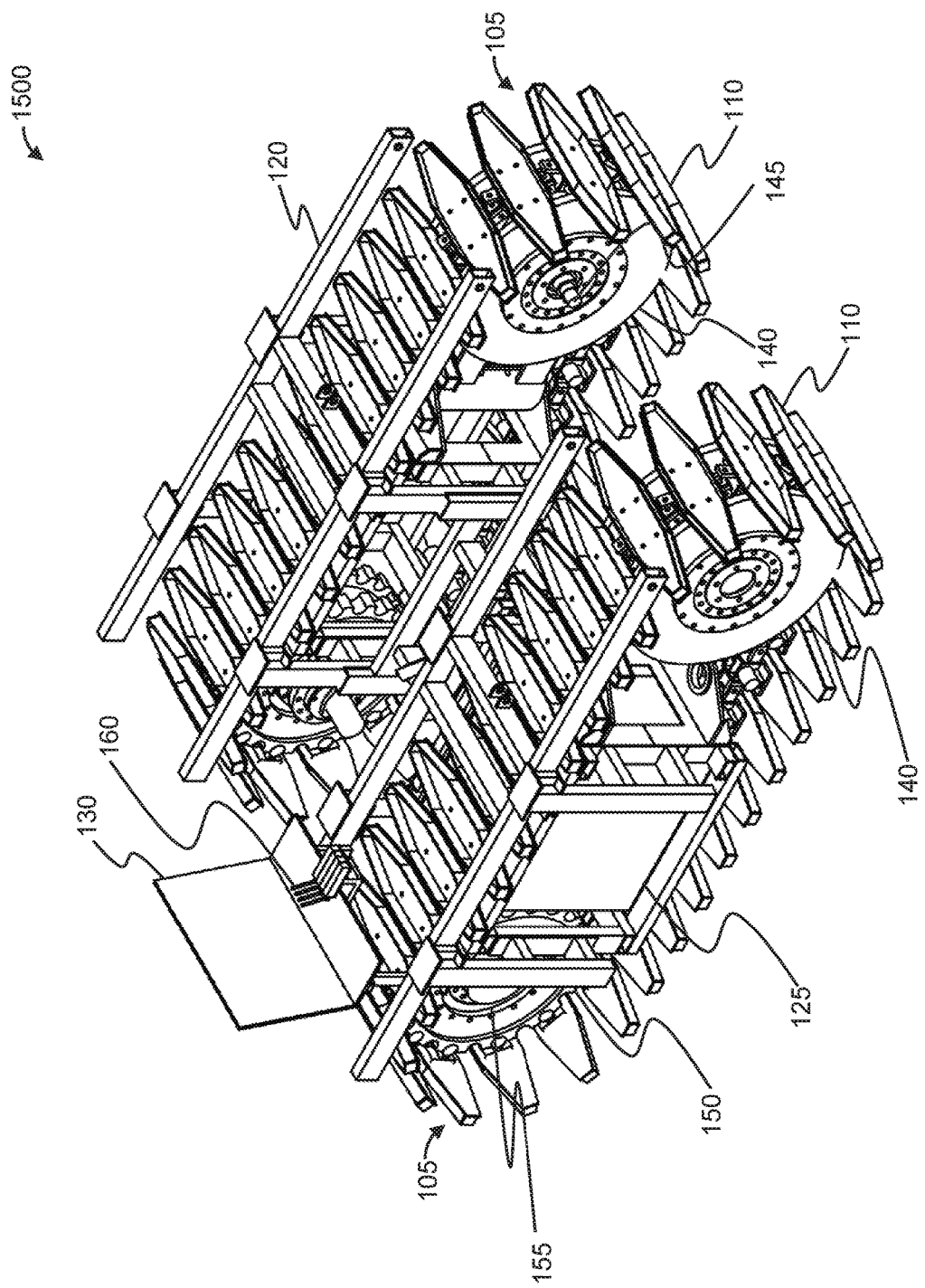
FIG. 15 illustrates a perspective view of a multi-track crawler vehicle, according to an embodiment.

FIG. 15 illustrates a perspective view of a multi-track crawler vehicle 1500, according to an embodiment. In the multi-track crawler vehicle 1500, two single crawler tracks 105 are arranged in a side-by-side dual-track arrangement. The two independent continuous, endless single crawler tracks 105 are connected side-by-side, in parallel, fastened with male and female connecting members 1640 and 1650 (seen in FIG. 16) in between them.

In embodiments, the two single crawler tracks 105 can be the same, similar, or different crawler track designs. The male and female connecting members 1640 and 1650 can be adapted to join the two crawler tracks 105 (possibly of different design) to form a multi-track crawler vehicle 1500.

In an embodiment, each single crawler track 105 can be driven by a power pack 125. In an embodiment, one of the single crawler tracks 105 can have a power pack 125 and the hydraulic power from the one power pack 125 as source can be provided to the second crawler track 105 by means of "quick connect/disconnect" hydraulic hoses. In an embodiment, the second crawler track 105 is driven by a hydraulic motor gearbox 155, conventionally termed as a hydrostatic drive. In an embodiment, a mechanical transmission is used to provide drive to one or more crawler tracks 105.

In an embodiment, two or more such crawler tracks 105 can be connected together to form a multi-track crawler vehicle 1500. Each such crawler track 105 can have its own independent power pack 125 or source power from another crawler track 105. In an embodiment, the independent power packs 125 of each crawler track 105 can be used to provide power to hydraulic motor gearboxes 155 driving the sprocket sets 150 and the hydraulic steering cylinders 520 for steering operation of the crawler track 105. In an embodiment, the hydraulic control valve set 160 to control the power packs 125 can be mounted on one of the crawler tracks 105 so that one operator can control one or more power packs 125 from the operator seat 130 at any given time.

In various embodiments, a power pack 125, mounted on any one of the tracks, is used to provide hydraulic power to both crawler tracks 105 via hydraulic hoses or mechanical transmission. The hydraulic hoses from the power pack 125 and/or mechanical transmission means drive power to the sprocket sets 150 via hydraulic motors and/or transmission gearboxes. The hydraulic hoses from the power pack 125 and/or mechanical actuation provide power for hydraulic cylinders 520 or the mechanical steering mechanism. The hydraulic hoses from the power pack 125 and/or mechanical actuation provide implement lifting, control, and power for implements. An operator from the operator seat 130 uses a hydraulic control valve set 160 to control hydraulic functions on both crawlers tracks 105, such as, but not limited to, forward and reverse motion hydraulic motors, steering, and implement control.

In an embodiment, each crawler track 105, left and right, is driven by an independent hydraulic motor gearbox 155 providing propulsion to the sprocket set 150 on each track. Each crawler track 105 also has an independent front idler set 140 fitted over a front axle 145. The hydraulic power from the power pack 125 is transferred by means of "quick connect/disconnect" hydraulic hoses to the left and right crawler tracks 105 after connecting them together. This provides an easy and quick transformation of two single crawler tracks 105 into a multi-track crawler vehicle 1500.

In an embodiment, steering of the multi-track crawler vehicle 1500 can be achieved by either or a combination of two steering mechanisms. The first is by differing speed of one crawler track 105 vis-a-vis the other. This is similar to how conventional crawler tracks, with side-by-side, parallel crawler tracks, are steered. The second is by steering the front idler set 140 and/or sprocket set 150 of each of the crawler tracks 105 about the vertical axis 530 as shown in FIG. 7.

This transformation of two or more independent single crawler tracks 105 into a multi-track crawler vehicle 1500 is advantageous when the multi-track crawler track vehicle 1500 is used in an open access environment, where vehicle width is not of concern. Examples where vehicle width is not of concern include: ploughing operations in open fields, i.e., while crops are not yet sowed; earth-moving applications such as wide area leveling; and bulldozing performed in open, wide access areas.

This easy and quick transformation from a single-track crawler vehicle 100 to a multi-track crawler vehicle 1500 makes the vehicle versatile for narrow access as well as open access areas, as desired by the operator's needs. The ability to carry out this transformation combines the advantages of wide crawler track vehicles (e.g., for earth-moving and agricultural applications) with the narrow access singly steerable crawler track vehicle.

Figure 16:
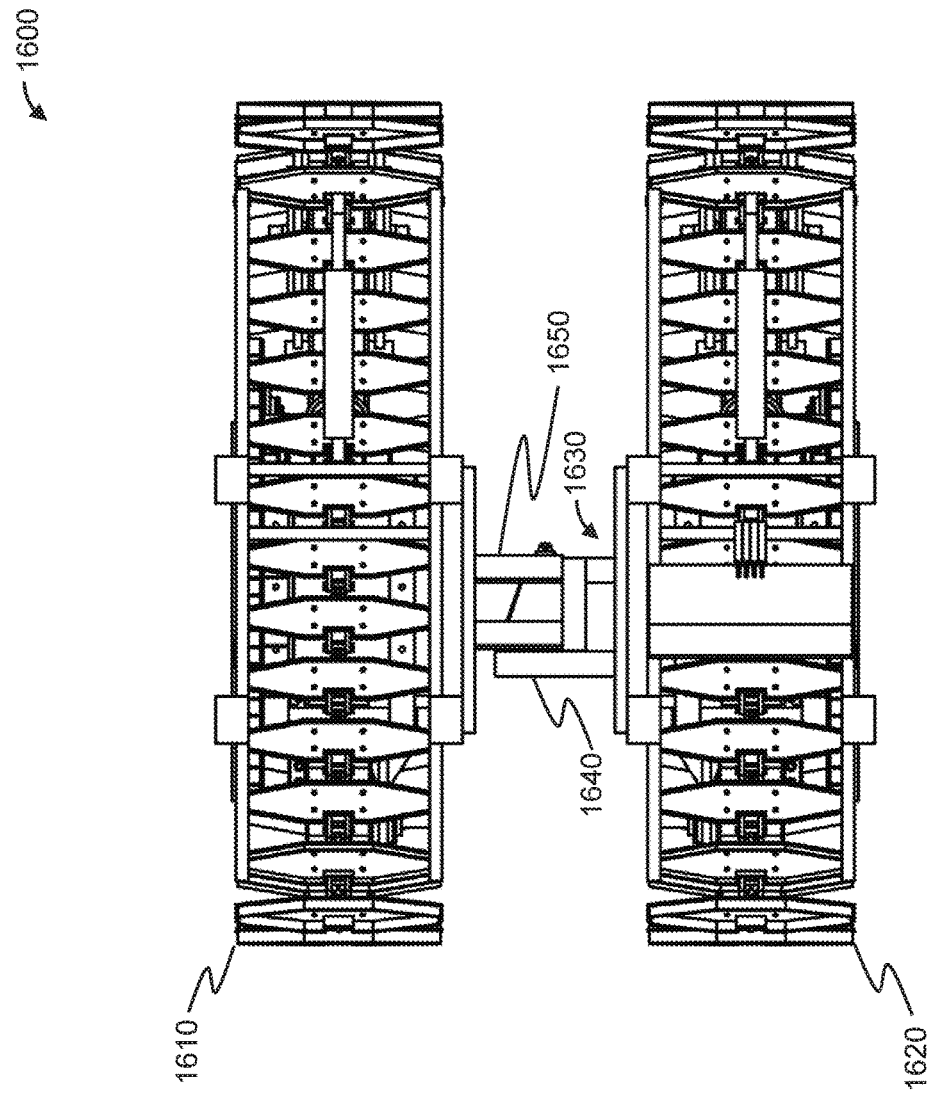
FIG. 16 illustrates a top view of a male-to-female crawler track connection, according to an embodiment.

FIG. 16 illustrates a top view of a male-to-female crawler track connection 1600 of a multi-track crawler vehicle 1500, according to an embodiment. The male connecting member 1640 is shown attached to a right crawler track 1620. The female connecting member 1650 is shown attached to a left crawler track 1610. The male 1640 and female 1650 connecting members together form the connecting member 1630 of the multi-track crawler vehicle 1500. The left crawler track 1610 and right crawler track 1620 can detach and attach to each other using the male 1640 and female 1650 connecting members attached to them respectively. Thus, the multi-track crawler can transform from two single-track crawlers 1610 and 1620 to a multi-track crawler vehicle 1500 using the connecting member 1630.

FIG. 17 illustrates a top view of a connecting member system 1700, according to an embodiment. FIGS. 18, 19, and 20 illustrate various perspective views of the connecting member system 1700 of FIG. 17. The male connecting member 1640 and the female connecting member 1650 of connecting member 1630 are shown separately in FIGS. 17-20. These male 1640 and female 1650 connecting members are connected to either one of two or more single crawler tracks 105 respectively. Once the crawler tracks 105 come close to each other, the frusto-pyramid-shaped male connecting member 1640 fits into the frusto-pyramid-shaped female connecting member 1650, aligning the two or more single tracks in parallel with each other. Once the male 1640 and female 1650 connecting members fit into each other, the two or more single crawler tracks 105 are attached using fasteners to form a rigid connection, thus forming the male-to-female crawling track connection 1600 as shown in FIG. 16. In various embodiments, the connecting members can have one or more male or female members. In other embodiments, the male and female connecting members can have prismatic, conical, or other suitable shapes to assist alignment of the right and left crawler tracks 105.

Figure 21:
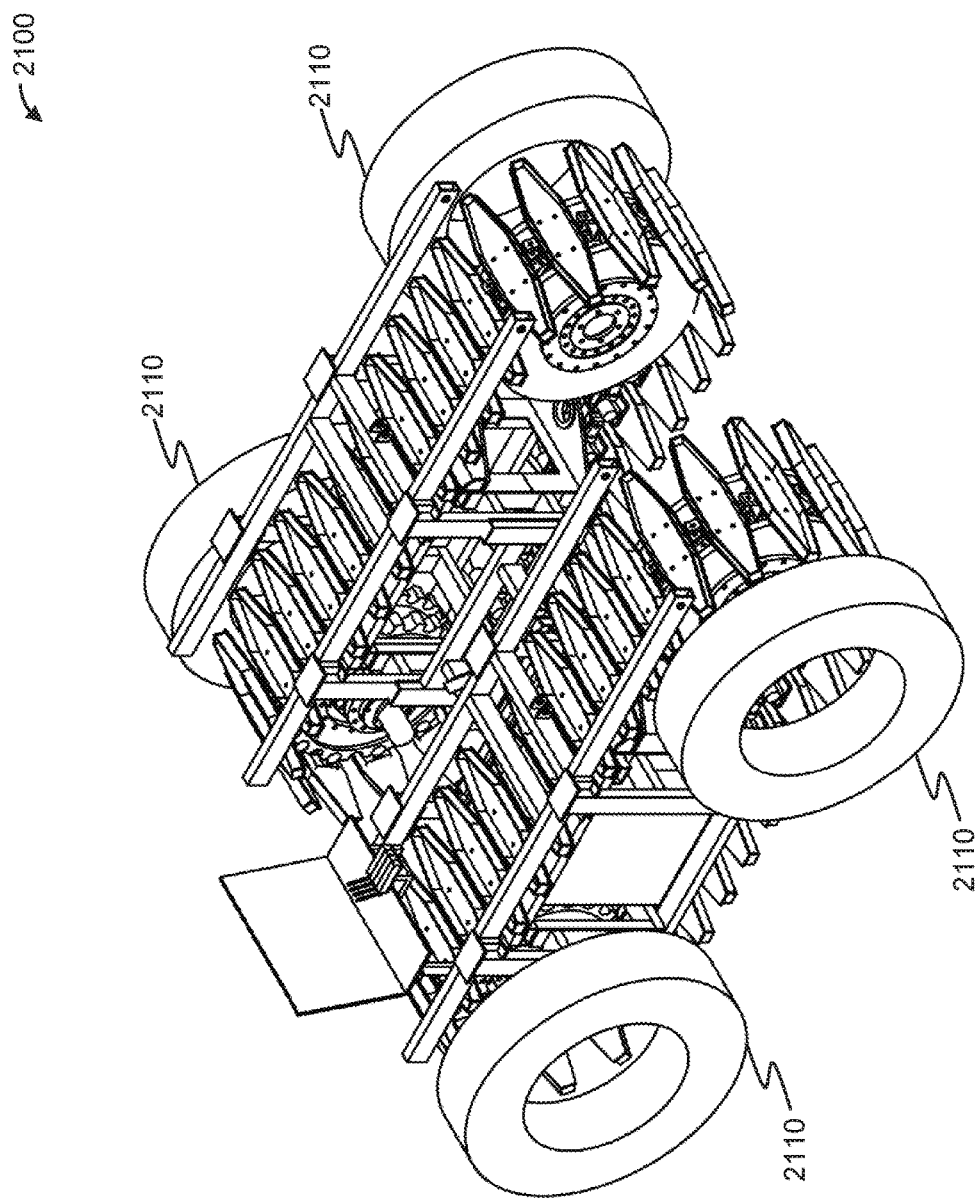
FIG. 21 illustrates a perspective view of a multi-track crawler vehicle fitted with rubber tires, according to an embodiment.

FIG. 21 illustrates a perspective view of a multi-track crawler vehicle fitted with rubber tires 2100, according to an embodiment. In an embodiment, the multi-track crawler vehicle 1500 (shown in FIG. 15) can be fitted with four or more rubber tires 2110 (e.g., two on the left and two on the right side of the multi-track crawler vehicle 1500). Wheel hub sets 2210 (shown in FIG. 22) can be used to attach the rubber tires 2110 with fasteners to the sprocket set 150 and front idler set 140.

Figure 22:
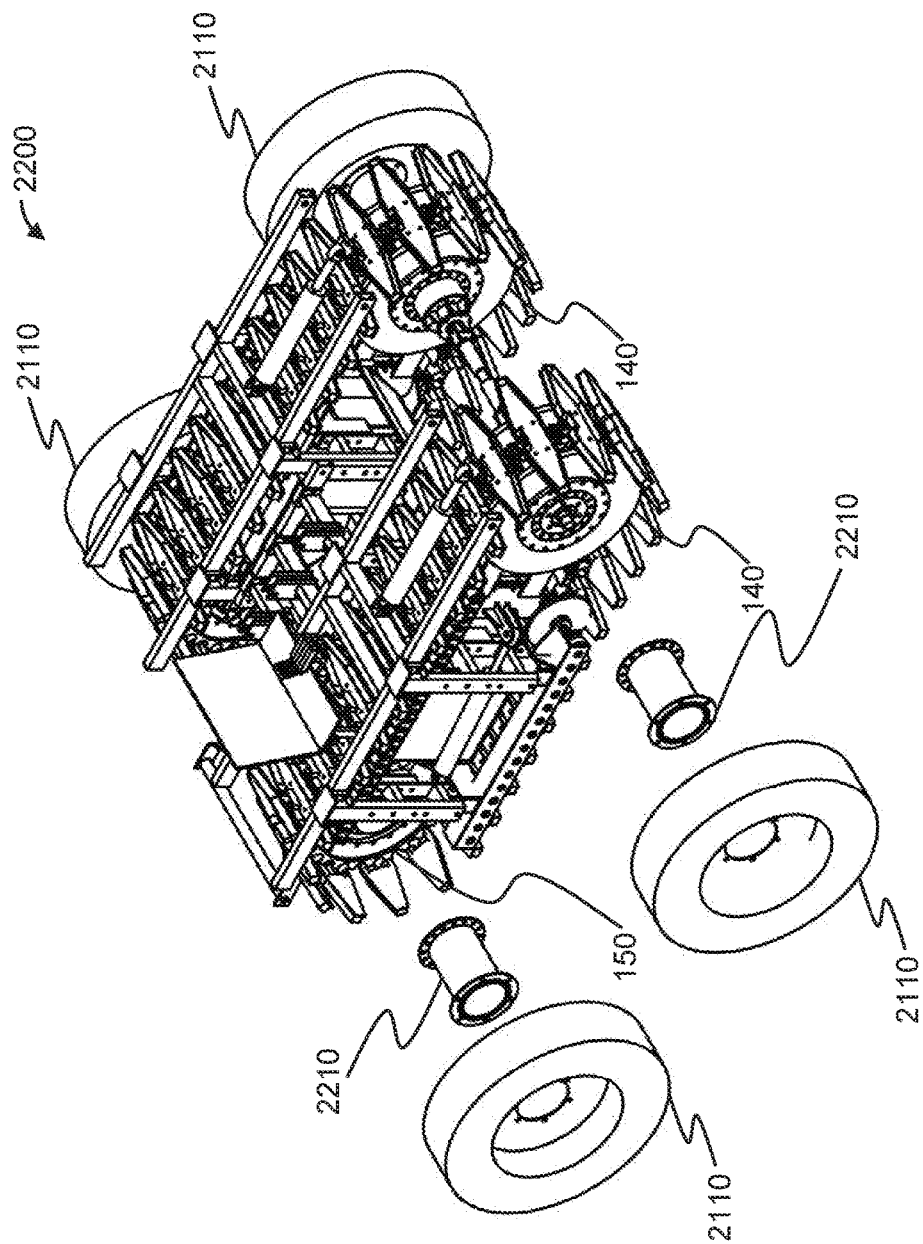
FIG. 22 illustrates an exploded view of a rubber wheel connection system, according to an embodiment.

FIG. 22 illustrates an exploded view of a rubber wheel connection system 2200, according to an embodiment. As shown in the FIG. 22, the rubber tires 2110 are attached to the front idler set 140 and the sprocket set 150 of the crawler tracks 105 by means of wheel hubs 2210 and fasteners. The wheel hubs 2210 make it easy for attaching and detaching the rubber tires 2110. In an embodiment, the wheel hubs 2210 may comprise metal flanges and a seamless pipe welded together.

Figure 27:
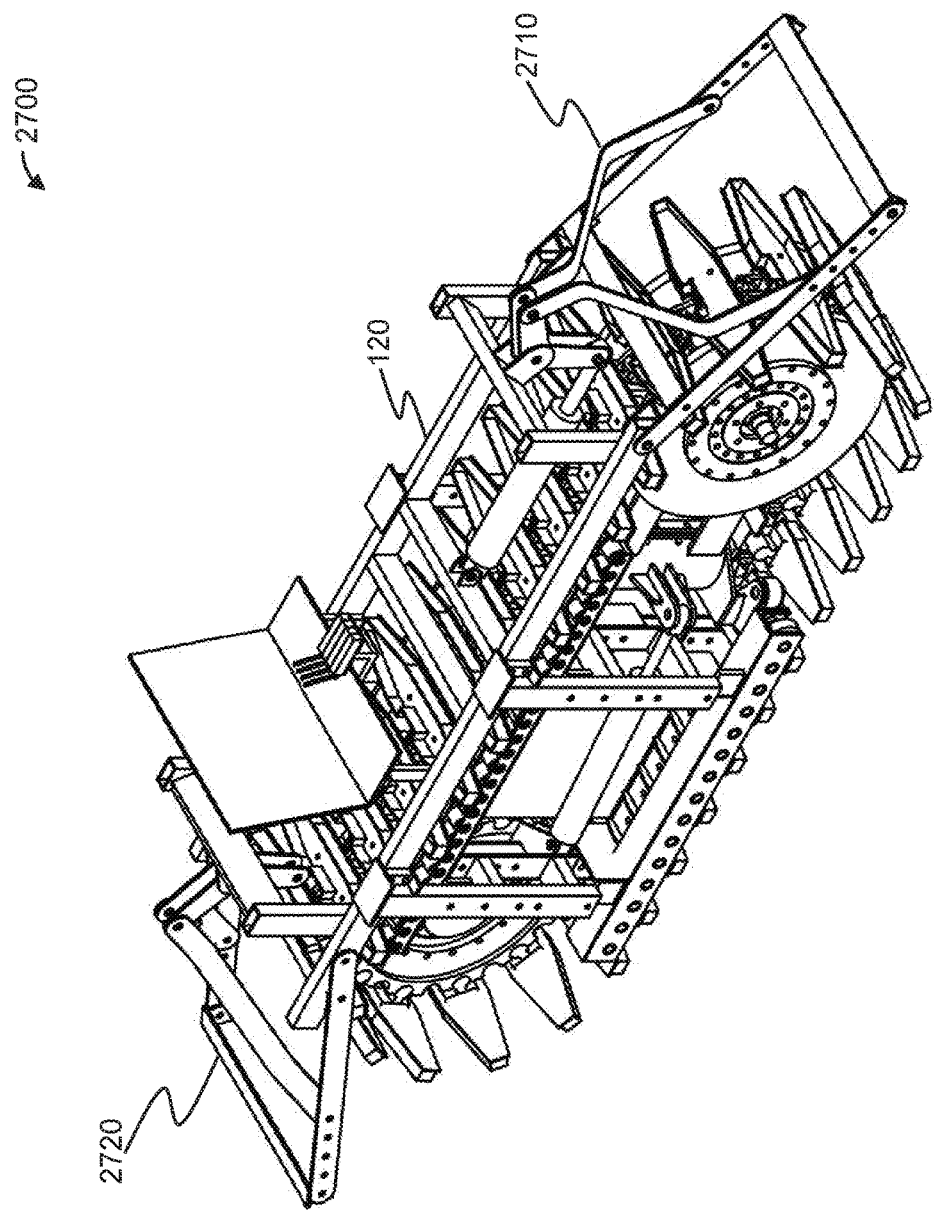
FIG. 27 illustrates a perspective view of a front and rear hitch equipped single-track crawler vehicle, according to an embodiment.

In an embodiment, the diameter of the tires 2110 is larger than the overall height of the crawler track 105. The crawler tracks 105 are lifted above the ground to fit the wheel hub sets 2210 and rubber tires 2110. This lifting can be achieved by means of hydraulic or mechanical lifting jacks. In an embodiment, three-point hitches 2710 and/or 2720 (as shown in FIG. 27) of each crawler track 105 are pressed against the ground to lift the crawler track 105 above the ground enough to fit the rubber tires 2110. In various embodiments, one or more three-point hitches 2420, 2430, 2710 and 2720 (as shown in FIGS. 24 and 27) at the front and/or rear of a multi-track crawler vehicle 1500 are pressed against the ground to lift the crawler track 105 high enough above the ground to fit the rubber tires 2110.

In an embodiment, for the forward and rear motion of the vehicle, the rubber tires 2110 are connected to the sprocket set 150 via the wheel hub sets 2210, and hence are propelled along with the sprocket set 150 by the hydrostatic power provided by the power pack 125. The front rubber tires 2110 are directly connected to the front idler set 140 via the wheel hub sets 2210 and hence are propelled when the front idler set 140 is propelled by the moving chain track. This makes it an all-wheel-drive vehicle, as the front idlers are "driven" by the crawler track and hence all wheels are driven. The crawler track 105 can also be dismantled after the rubber tires 2110 are installed. The rubber tires 2110 can be directly driven by the sprocket set 150 and/or the front idler set 140, or by a separate mechanical transmission from the power pack 125.

In an embodiment, steering of a multi-track crawler vehicle fitted with rubber tires 2100 can be achieved in the same manner as for the multi-track crawler vehicle 1500. This can be achieved in one of two ways (or both). The first is differing speed or direction of one crawler track 105 vis-a-vis the other. This is similar to how conventional crawler tracks or skids, with side-by-side crawler tracks or tires, are steered. The rubber tires 2110 on the slower of the two crawler tracks 105 skid to accommodate for this difference in speed or direction of the crawler tracks 105. The second is steering both the front idler set 140 and/or sprocket set 150 of each track about their vertical axis 530 (as shown in FIG. 7). The rubber tires 2110 attached to the front idler set 140 and/or sprocket set 150 via wheel hub sets (as shown in FIG. 22) also steer accordingly, giving a turning movement to the vehicle. The vehicle 2100 can be steered in either the left or right direction, while in forward or reverse motion.

The crawler tracks 105 on the multi-track crawler vehicle fitted with rubber tires 2100 can be above the ground due to a larger diameter of the rubber tires 2110, and hence the crawler track 105 does not touch the ground in this rubber tire arrangement. Only the rubber tires 2110 rest on the ground. This allows the vehicle to ply on asphalt (paved) roads on rubber tires 2110 without the crawler tracks 105 touching the paved road. In an embodiment, the crawler tracks 105 are also moving along with the rubber tires 2110, in which case ground clearance does not become an issue even though the crawler track 105 is just slightly above the ground. The crawler tracks 105 may come in contact with the ground, but since they are moving in the same direction as the rubber tires 2110, they do not become an obstruction to the motion of the vehicle 2100. For example, there may be instances where there is uneven terrain and the crawler tracks 105 contact the ground, yet without bearing the weight of the vehicle 2100. Advantageously, the contact is not of concern because the crawler tracks 105 are moving. The crawler tracks 105 may bear the weight of the vehicle 2100 if the rubber tires 2110 get lifted off the ground say due to a small mound that comes only under the crawler track 105 and not a rubber tire 2110.

The ability to ply on paved roads on rubber tires is advantageous for quick self-transportation, i.e., without the need for a separate truck to carry the crawler vehicle. This is advantageous for hauling loads on paved roads using a trailer.

Advantageously, the multi-track crawler vehicle 1500 is transformable into a multi-track crawler vehicle fitted with rubber tires 2100. The process of attaching tires is quick and easy. In various embodiments, no separate drive elements like transmission are required during this conversion.

Figure 23:
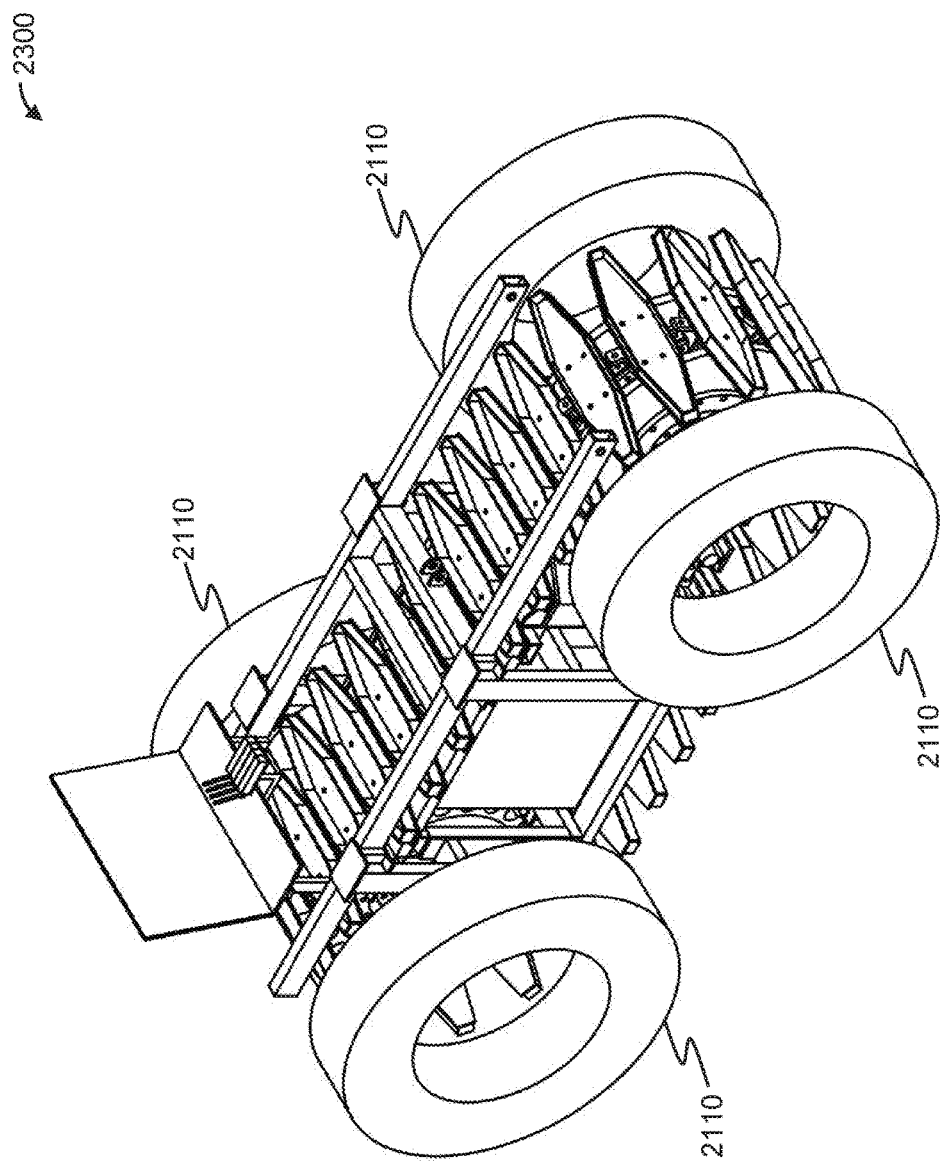
FIG. 23 illustrates a perspective view of a single-track crawler vehicle fitted with rubber tires, according to an embodiment.

FIG. 23 illustrates a perspective view of a single-track crawler vehicle fitted with rubber tires 2210, according to an embodiment. Similar to the multi-track crawler fitted with rubber tires 2100, four or more rubber tires 2110 are attached to a single-track crawler vehicle 100 on either side. Four rubber tires 2110 can be fitted to the left and right side of the single-track crawler vehicle 100 using wheel hub sets 2210 (as shown in FIG. 22) mounted on the front idler set 140 or sprocket set 150. In various embodiments, one or more three-point hitches 2710 and/or 2720 (as shown in FIG. 27) at the front and/or rear of the vehicle 2210 are pressed against the ground to lift the crawler track 105 high enough above the ground to fit the rubber tires 2110.

In an embodiment, the same steering mechanism that allows a single-track crawler vehicle 100 to steer (e.g., as shown in FIG. 11) is utilized to steer the crawler when rubber tires 2110 are fitted to the single-track crawler vehicle fitted with rubber tires 2210 as shown in FIG. 23. The front idler set 140 and/or sprocket set 150 steer about the vertical axis 530 of the single-track crawler vehicle fitted with rubber tires 2210 as exemplified by the steering mechanism 700 of FIG. 7. This steers the vehicle 2210 in the left or right direction while in a forward or reverse motion.

The transformation of a single-track crawler vehicle 100 to a single-track crawler vehicle fitted with rubber tires 2210 is advantageous when one crawler track is being used in a field application, i.e., without the need to connect a second crawler track to the vehicle.

FIG. 24 illustrates a front view of a front and rear hitch equipped multi-track crawler vehicle 2400, according to an embodiment. FIG. 25 illustrates a top view of the front and rear hitch equipped multi-track crawler vehicle 2400 of FIG. 24. FIG. 26 illustrates a perspective view of the front and rear hitch equipped multi-track crawler vehicle 2400 of FIG. 24. The connecting member 1630 and/or the chassis of a multi-track crawler vehicle 1500 may support the mounting of hitches, such as three-point hitches 2420 and 2430 for attaching implements to the multi-track crawler vehicle 1500. The implement hitches can be connected to the front 2420 and/or the rear 2430 of the multi-track crawler vehicle 1500. A dozer blade 2410 is shown as an exemplary implement attached to the front hitch 2420 of the front and rear hitch equipped multi-track crawler vehicle 2400. In an embodiment, the front and rear hitches can be added before or after the front and rear hitch equipped multi-track crawler vehicle 2400 is transformed into a rubber tire vehicle (e.g., as shown in FIG. 21).

FIG. 27 illustrates a perspective view of a front and rear hitch equipped single-track crawler vehicle 2700, according to an embodiment. The chassis 120 of the single-track crawler vehicle 100 supports the mounting of hitches, such as three-point hitches 2710 and 2720 for attaching implements to the single-track crawler vehicle 100. The implement hitches can be connected to the front 2710 and/or the rear 2720 of the single-track crawler vehicle 100. In an embodiment, the front and rear hitches can be added before or after the single-track crawler vehicle 100 is transformed into a rubber tire vehicle (e.g., as shown in FIG. 23).

Implements can be attached at the front and rear of the crawler track vehicles (e.g., those shown in FIG. 24 and FIG. 27) for being pushed or pulled by the crawler track vehicle. Implements like a plough or cultivator can be attached for agriculture applications, and a trencher, bulldozer, or leveler for earth-moving applications.

Figure 28:
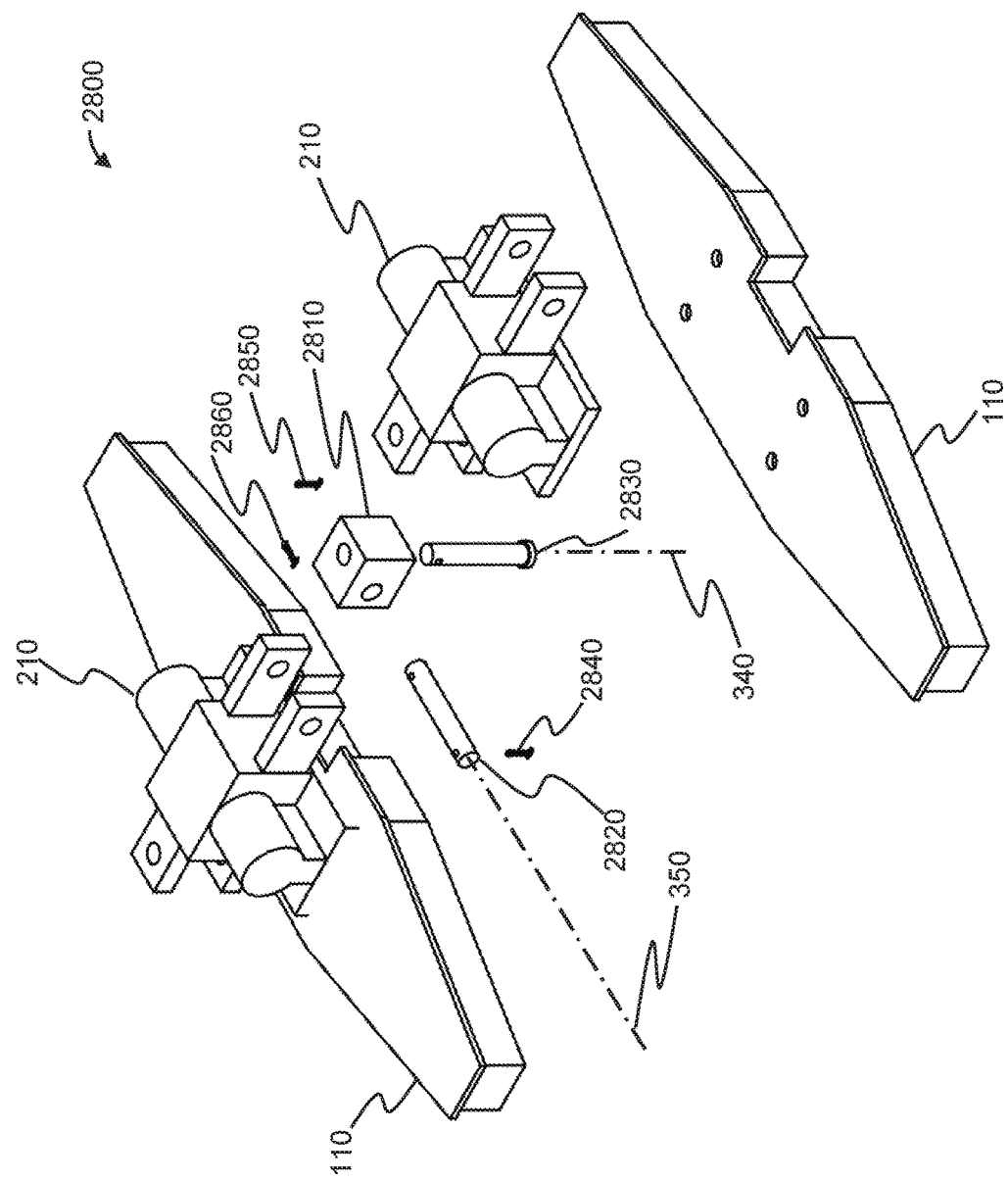
FIG. 28 illustrates an exploded view of a chain link connection, according to an embodiment.

FIG. 28 illustrates an exploded view of a chain link connection 2800, according to an embodiment. Similar to in FIG. 3, chain links 210 are shown connected to each other via a central block 2810 and connecting pins 2820 and 2830. As illustrated in FIG. 28, the central block 2810 is connected to the chain links 210 with a horizontal connecting pin 2820 and a vertical connecting pin 2830. In an embodiment, the horizontal connecting pin 4230 is held in its position by split pins 2840 and 2850 on either side of the horizontal connecting pin 4230. In an embodiment, the vertical connecting pin 2830 is held in its position by its own counter head at the bottom and a split pin 2860 at the top. The central block 2810 has its vertical and horizontal holes offset to each other (as shown in FIG. 29). The horizontal 2820 and vertical 2830 pins, and hence the horizontal axis 350 and the vertical axis 340 respectively, do not intersect (i.e., are offset to each other).

FIG. 29 illustrates a front view of a central block 2900, according to an embodiment. FIG. 30 illustrates a side view of the central block 2900 of FIG. 29. FIG. 31 illustrates a top view of the central block 2900 of FIG. 29. FIG. 32 illustrates a perspective view of the central block 2900 of FIG. 29. The central block 2810 has two holes that are perpendicular but offset from each other to fit connecting pins 2820 and 2830 as shown in FIG. 28. The vertical axis 340 and horizontal axis 350 of the two holes of the central block 2810 provide two degrees of freedom to the chain link 210 as shown in FIG. 28. FIGS. 29-32 illustrate an embodiment where the two axes of freedom 340 and 350 do not need to be concentric; i.e., they may be offset to each other. It will be understood that other suitable shapes, locations, or configurations of the holes may be used to facilitate connection of chain links.

Figure 33:
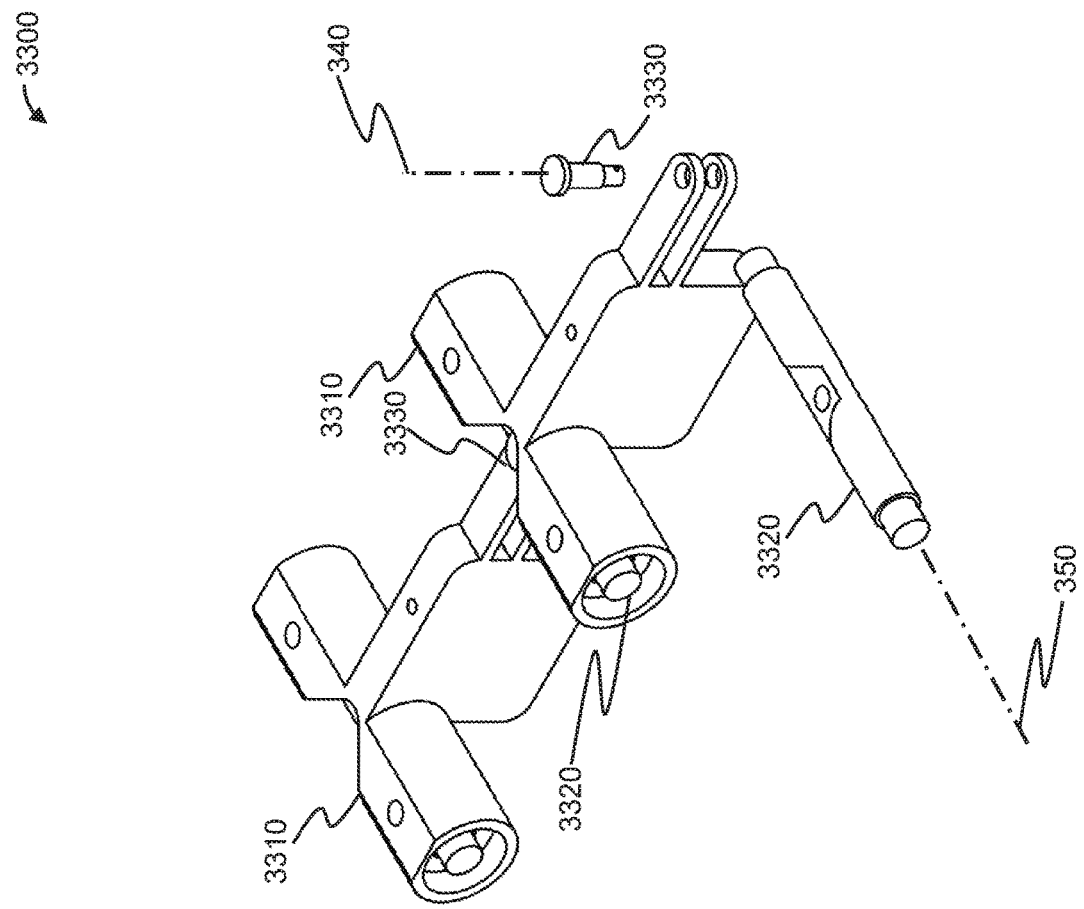
FIG. 33 illustrates an exploded view of a chain link connection, according to an embodiment.

FIG. 33 illustrates an exploded view of a chain link connection 3300, according to an embodiment. The chain link connection 3300 shows how chain links 3310 can be connected by connecting pins 3320 and 3330 without the need for a central block. The connecting pin 3320 fits within a cylindrical hole of the chain link 3310 with a degree of freedom about the horizontal axis 350. The connecting pin 3330 fits in the cylindrical hole in the chain link 3310 and connecting pin 3320 with a degree of freedom about the vertical axis 340. In the chain link connection 3300, a central block is not necessary to the connect chain links 3310 with two axes of freedom 340 and 350 of the crawler track 105 of the single-track crawler vehicle 100.

FIG. 34 illustrates a perspective view of a multi-steering arrangement 3400 of a single-track crawler vehicle 100, according to an embodiment. FIG. 35 illustrates a top view of the multi-steering arrangement 3400 of FIG. 34. As shown in FIGS. 34 and 35, multiple idler sets 140 and/or multiple sprocket sets 150 can turn in varying angles about their vertical axes 530 to steer the single-track crawler vehicle 100 in the right or left direction while in a forward or reverse motion. In various embodiments, one or more idler sets 140 and/or sprocket sets 150 turning at varying angles can be used to steer the single-track crawler vehicle 100. In an embodiment, at least one sprocket set 150 (shown as the middle sprocket set 150 in FIGS. 34 and 35) may be connected to the chassis 120. Each idler set 140 or sprocket set 150 can be connected to its adjacent idler set 140 or its adjacent sprocket set 150 via a fulcrum 510 and is able to rotate about the vertical axis 530 of the fulcrum 510. Each idler set 140 or sprocket set 150 can rotate about its vertical axis 530 by actuating the hydraulic cylinder 520 connected to either end of each fulcrum 510, thus providing steering motion to the crawler track 105. These various embodiments illustrate that multiple sprocket sets 150 and/or idler sets 140 can steer at varying angles providing a multi-steering arrangement. In various embodiments, a sprocket set 150 or an idler set 140 is connected to the chassis 120 of the single-track crawler vehicle 100. In various embodiments, the sprocket sets 150 and/or idler sets 140 are connected to each other via their fulcrums 510.

Figure 36:
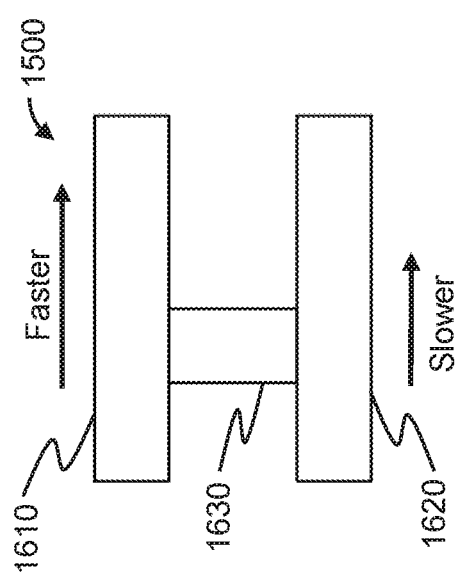
FIG. 36 illustrates a block diagram of a top view of differential speed steering of a multi-track crawler vehicle, according to an embodiment.

FIG. 36 illustrates a block diagram of a top view of differential speed steering 3600 of a multi-track crawler vehicle 1500, according to an embodiment. As shown in FIG. 36, the multi-track crawler vehicle 1500 can be steered by differing speeds of the left crawler track 1610 vis-a-via the right crawler track 1620. The left crawler track 1610 can be faster or slower than the right crawler track 1620.

Figure 37:
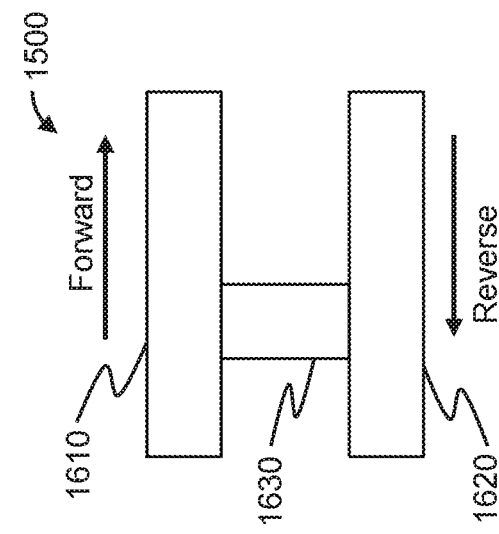
FIG. 37 illustrates a block diagram of a top view of differential direction steering of a multi-track crawler vehicle, according to an embodiment.

FIG. 37 illustrates a block diagram of a top view of differential direction steering 3700 of a multi-track crawler vehicle 1500, according to an embodiment. As shown in FIG. 37, the multi-track crawler vehicle 1500 can be steered by a differing direction of motion of the left crawler track 1610 vis-a-via the right crawler track 1620. The left crawler track 1610 can move in the opposite direction as the right crawler track 1620.

In various embodiments, either or both steering methods, differential speed and differential direction as shown in FIGS. 36 and 37, may be used to steer the multi-track vehicle. As shown in FIGS. 36 and 37, the left crawler track 1610 and right crawler track 1620 may be connected together via a connecting member 1630.

Figure 38:
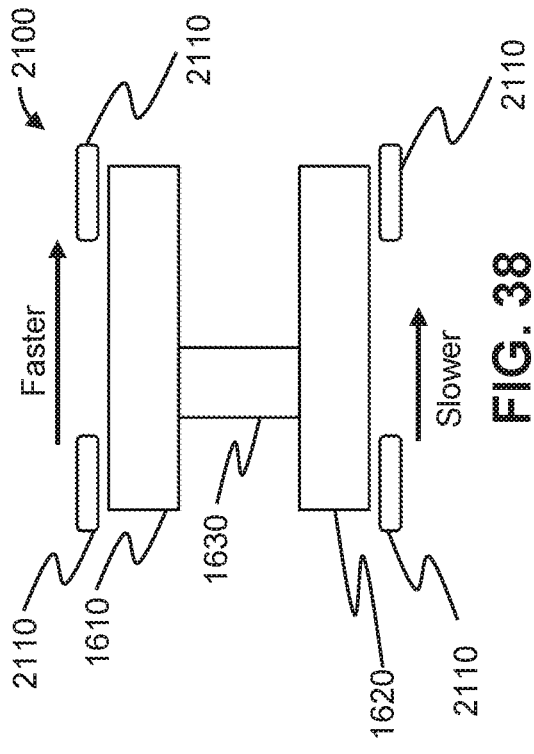
FIG. 38 illustrates a block diagram of a top view of differential speed steering of a multi-track crawler vehicle fitted with rubber tires, according to an embodiment.

FIG. 38 illustrates a block diagram of a top view of differential speed steering 3800 of a multi-track crawler vehicle fitted with rubber tires 2100, according to an embodiment. As shown in FIG. 38, the multi-track crawler vehicle fitted with rubber tires 2100 can be steered by differing speeds of the left crawler track 1610 vis-a-vis the right crawler track 1620 similar to FIG. 36.

Figure 39:
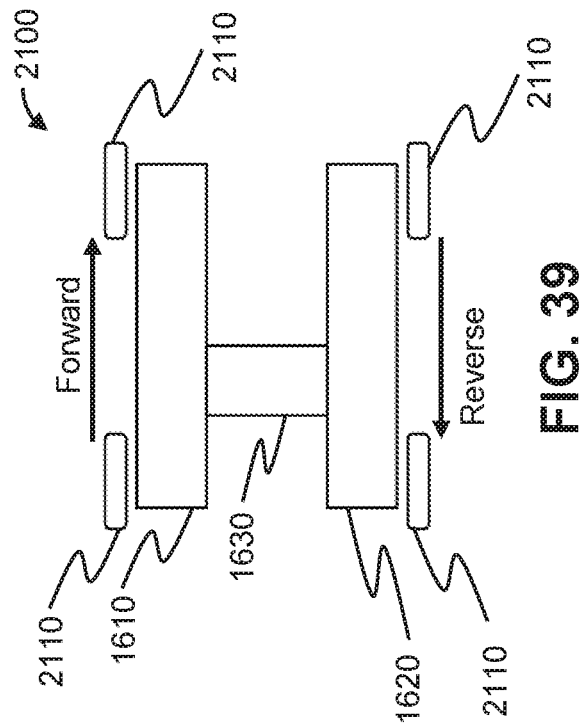
FIG. 39 illustrates a block diagram of a top view of differential direction steering of a multi-track crawler vehicle fitted with rubber tires, according to an embodiment.

FIG. 39 illustrates a block diagram of a top view of differential direction steering 2100 of a multi-track crawler vehicle fitted with rubber tires 2100, according to an embodiment. As shown in FIG. 38, the multi-track crawler vehicle fitted with rubber tires 2100 can be steered by differing direction of motion of the left crawler track 1610 vis-a-vis the right crawler track 1620 similar to FIG. 37.

FIG. 40 illustrates a block diagram of a top view of front steering 4000 of a multi-track crawler vehicle 1500, according to an embodiment. As shown in FIG. 40, the multi-track crawler vehicle 1500 can be steered by turning the front idler set 140 (not shown) of the left crawler track 1610 and the right crawler track 1620. To assist in doing a tighter turn, the left crawler track 1610 can be run faster or slower than the right crawler track 1620. The left crawler track 1610 can also move in the reverse direction of the right crawler track 1620. One or a combination of these steering methods can be used to steer the multi-track crawler vehicle 1500. In an embodiment, the rear sprocket set 150 of the left crawler track 1610 and the right crawler track 1620 can also be steered about its vertical axis 530 to steer the multi-track crawler as shown in FIG. 7.

FIG. 41 illustrates a block diagram of a top view of front steering 4100 of a multi-track crawler vehicle fitted with rubber tires 2100 using wheel hubs 2210 (shown in FIG. 22), according to an embodiment. As shown in FIG. 41, the multi-track crawler vehicle fitted with rubber tires 2100 can be steered by turning the front idler set 140 (not shown) of one or both of the left crawler track 1610 and right crawler track 1620 and also a combination of differing speed and/or direction of the left crawler track 1610 vis-a-via the right crawler track 1620 similar to FIG. 40.

FIG. 42 illustrates a block diagram of a top view of front and rear inward steering 4200 of a multi-track crawler vehicle 1500, according to an embodiment. As shown in FIG. 42, the multi-track crawler vehicle 1500 can be steered by turning the front idler set 140 and the sprocket set 150 of the left crawler track 1610 and the right crawler track 1620 inward. To assist in doing a tighter turn, further the left crawler track 1610 can be faster or slower than the right crawler track 1620. The left crawler track 1610 can also move in the opposite direction as the right crawler track 1620. Either or a combination of these steering methods can be used to steer the multi-track crawler vehicle 1500.

FIG. 43 illustrates a block diagram of a top view of front and rear inward steering 4300 of a multi-track crawler vehicle fitted with rubber tires 2100, according to an embodiment. As shown in FIG. 43, the multi-track crawler vehicle is fitted with rubber tires 2100 using wheel hubs 2210 (shown in FIG. 22). The rubber tires of the multi-track crawler vehicle 2100 can be steered by turning the front idler sets 140 and the sprocket sets 150 inward and optionally a combination of differing speed and/or direction of the left crawler track 1610 vis-a-via the right crawler track 1620 similar to in FIG. 42.

FIG. 44 illustrates a block diagram of a top view of front inward steering 4400 of a multi-track crawler vehicle 1500, according to an embodiment. As shown in FIG. 44, the multi-track crawler vehicle 1500 can be steered by turning the front idler set 140 of the left crawler track 1610 inward in the opposite direction of the front idler set 140 of the right crawler track 1620. The left crawler track 1610 can also move in the opposite direction or a differential speed vis-a-vis the right crawler track 1620. Either or a combination of these steering methods can be used to steer the multi-track crawler vehicle 1500. The sprocket sets 150 of one or both crawler tracks can be steered to achieve a turn for the multi-track crawler vehicle 1500.

FIG. 45 illustrates a block diagram of a top view of front inward steering 4500 of a multi-track crawler vehicle fitted with rubber tires 2100, according to an embodiment. As shown in FIG. 45, the multi-track crawler vehicle is fitted with rubber tires 2100 using wheel hubs 2210 (shown in FIG. 22). The rubber tires of the multi-track crawler vehicle 2100 can be steered by turning the front idler set 140 of the left crawler track 1610 inward in the opposite direction of the front idler set 140 of the right crawler track 1620. The left crawler track 1610 can also move in the reverse direction of the right crawler track 1620. Either or a combination of these steering methods can be used to steer the multi-track crawler vehicle fitted with rubber tires 2100. The sprocket sets 150 of one or both crawler tracks can be steered to achieve a turn for the multi-track crawler vehicle fitted with rubber tires 2100.

Figure 46:
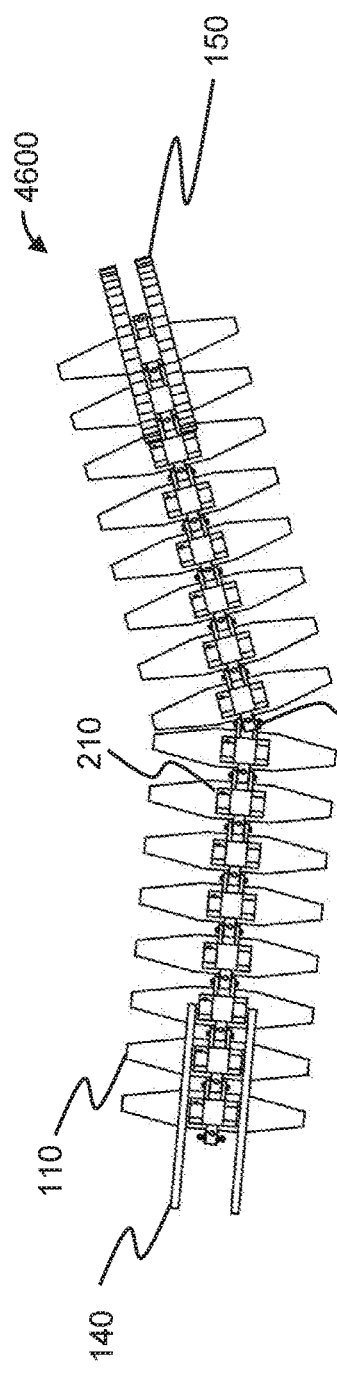
FIG. 46 illustrates a block diagram of a top view of single fulcrum steering of a single-track crawler vehicle, according to an embodiment.

FIG. 46 illustrates a block diagram of a top view of single fulcrum steering 4600 of a single-track crawler vehicle 100, according to an embodiment. As shown in FIG. 46, the single-track crawler vehicle 100 can be steered by turning the front idler set 140 in the opposite direction of the sprocket set 150. In an embodiment, the vertical axis 530 of the front idler set 140 and the sprocket set 150 of the crawler track 105 is the same; i.e., the front idler set 140 and the sprocket set 150 rotate about the same vertical axis 530. This results in a tighter turn than that shown in FIGS. 4 and 7 where the front idler set 140 and the sprocket set 150 may have distinct fulcrums 510 and hence vertical axes 530.

Figure 47:
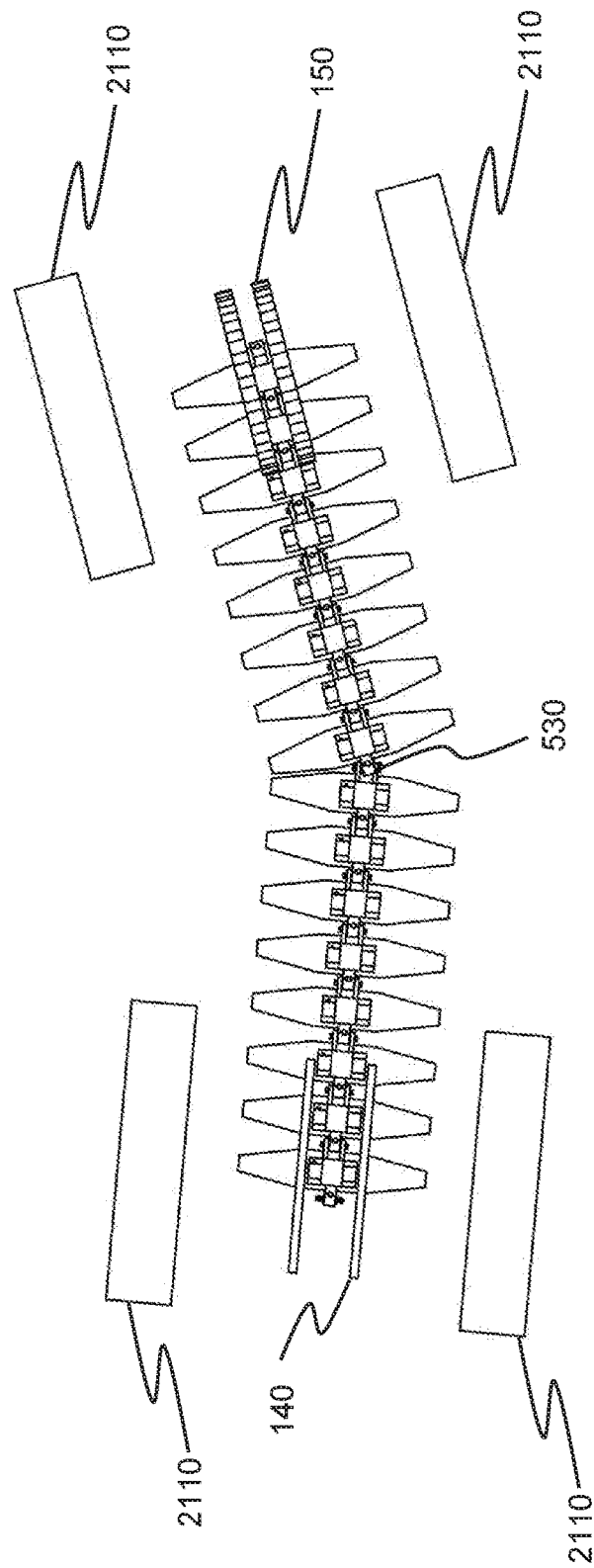
FIG. 47 illustrates a block diagram of a top view of single fulcrum steering of a single-track crawler vehicle fitted with rubber tires, according to an embodiment.

FIG. 47 illustrates a block diagram of a top view of single fulcrum steering 4700 of a single-track crawler vehicle fitted with rubber tires 2300, according to an embodiment. As shown in FIG. 47, the single-track crawler vehicle fitted with rubber tires 2300 can be steered by turning the front idler set 140 of the crawler track 105 in the opposite direction of the sprocket set 150 similar to in FIG. 46

FIG. 48 illustrates a block diagram of a top view of a multi-track crawler vehicle fitted with sixteen rubber tires 4800, according to an embodiment. FIG. 49 illustrates a block diagram of a top view of a multi-track crawler vehicle fitted with eight rubber tires 4900, according to an embodiment. Two or more single crawler tracks 105 can be connected via one or more connecting members 1630. One or more rubber tires 2110 can be on either side of each of the crawler tracks 105. One or more rubber tires 2110 can be fitted to a side of each of the crawler tracks 105.

Figure 50:
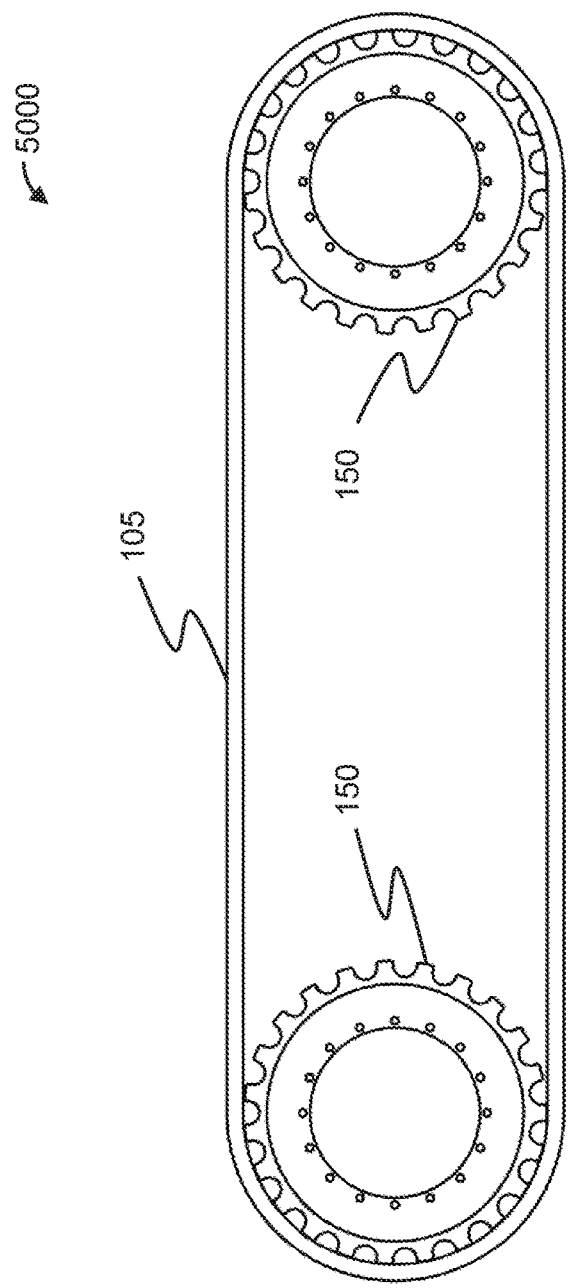
FIG. 50 illustrates a block diagram of a front view of a two-sprocket arrangement for a crawler track, according to an embodiment.

FIG. 50 illustrates a block diagram of a front view of a two-sprocket arrangement 5000 for a crawler track 105, according to an embodiment. As shown in FIG. 50, the crawler track 105 can have two driving sprocket sets 150, one in the front and one in the rear. In other embodiments, the crawler track 105 can have three or more driving sprocket sets 150. In an embodiment, the crawler track 105 can have one or more idler sets 140 to guide and steer the crawler track 105 and its elements.

Figure 51:
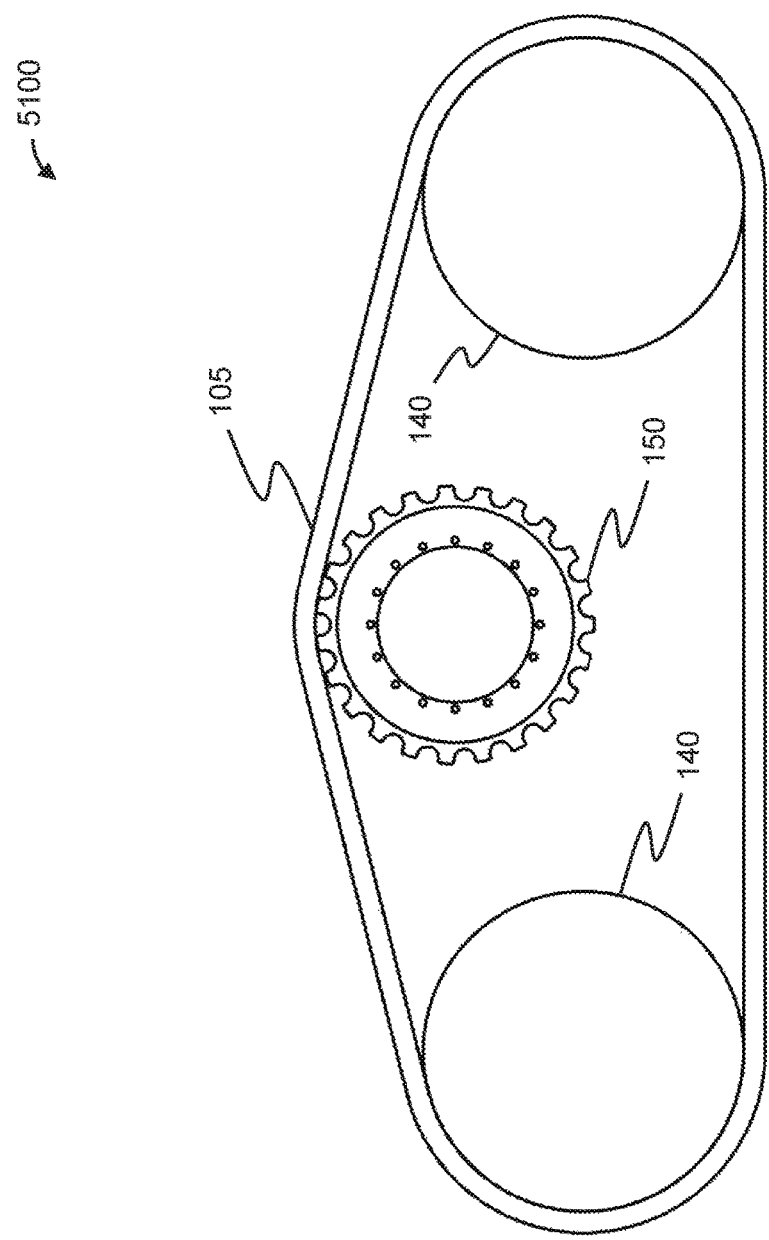
FIG. 51 illustrates a block diagram of a front view of a first sprocket and idler arrangement for a crawler track, according to an embodiment.

FIG. 51 illustrates a block diagram of a front view of a first sprocket and idler arrangement 4100 for a crawler track 105, according to an embodiment. As shown in FIG. 51, the crawler track 105 can have one or more driving sprocket sets 150 above the ground, i.e., not resting on the ground. The crawler track 105 can have one or more idler sets 140 resting on the ground to guide and steer the crawler track 105 and its elements. In another embodiment, the crawler track 105 can have one or more idler sets 140 above the ground to guide the crawler track 105 and its elements.

Figure 52:
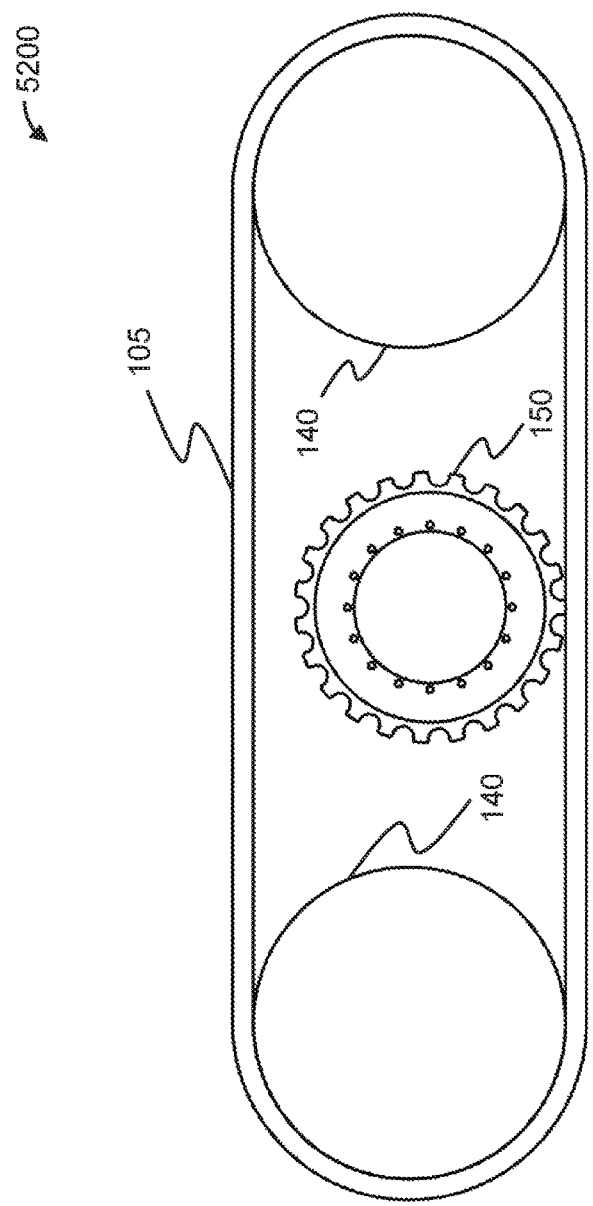
FIG. 52 illustrates a block diagram of a front view of a second sprocket and idler arrangement for a crawler track, according to an embodiment.

FIG. 52 illustrates a block diagram of a front view of a second sprocket and idler arrangement 5200 for a crawler track 105, according to an embodiment. As shown in FIG. 52, the crawler track 105 can have one or more driving sprocket sets 150 resting on the ground. The crawler track 105 can have one or more idler sets 140 resting on the ground to guide and steer the crawler track 105 and its elements. In another embodiment, the crawler track 105 can have one or more idler sets 140 above the ground to guide the crawler track 105 and its elements.

Advantageously, embodiments of the disclosed crawler vehicles achieve quick and easy interchangeable transformations: a singly steerable, serpentine steel track crawler for narrow access, demanding traction applications; a dual side-by-side, parallel track crawler for open access, demanding traction applications; and a four (or more) rubber tire arrangement, with single or dual tracks, for on-road applications.

Embodiments of the disclosed crawler vehicles bring versatility to the agriculture and earth-moving applications by combining the advantages of steel crawlers and rubber tire arrangements.

Embodiments of the disclosed crawler vehicles utilize hydraulic power to propel, control, and steer the vehicle. It will be understood that it is possible to provide a mechanical transmission, and differential, control, and steering arrangements in other embodiments.

Embodiments of the disclosed crawler vehicles utilize steel to craft various elements such as chain links, crawler slats, the chassis, idler sets, sprockets, and hitches of the vehicle. Also, embodiments of the disclosed crawler vehicle utilize rubber tires for plying on roads. It will be understood that it is possible to provide other suitable materials.

Embodiments of the disclosed crawler vehicles may utilize safety and protection arrangements such as roll-over protection bars.

Embodiments of the disclosed crawler vehicles may be controllable without having an operator seated on the vehicle. Such embodiments can employ a remote-control mechanism, such as a remotely controlled hydraulic valve system. The operator in such cases can be near the crawler vehicle, for example, walking behind/beside the tractor, or be far away from the crawler vehicle. Such a system may not need an operator seat and manual control system on the crawler tractor.

Embodiments of the disclosed crawler vehicles may be fitted with an autonomous, computer-controlled, driverless control system. Such a system may not need an operator seat and manual control system on the crawler tractor.

Embodiments of the disclosed multi-track crawler vehicles may have more than two crawler tracks. Where an embodiment has three or more crawler tracks, the adaptations, arrangements, attachments, configurations, connections, conversions, designs, fittings, methods, systems, and/or transformations described herein may be extended where desirable or necessary to allow for the additional crawler track(s).

Although the invention has been described with reference to certain specific embodiments, various modifications thereof will be apparent to those skilled in the art without departing from the spirit and scope of the invention as outlined in the claims appended hereto.

What is claimed is:

1. A crawler vehicle comprising:
a first chassis;
a power pack disposed in the first chassis;
a first sprocket set rotatably coupled to the first chassis and connected to the power pack to drive the first sprocket set along a direction of travel;
a first fulcrum pivotally coupled to the first chassis along the direction of travel;
a first idler set coupled to the first fulcrum; and
a first crawler track formed by end to end linking of a plurality of slats, each slat mounted on a respective chain link, the chain link of each of the plurality of slats are connected to the chain links of neighbouring slats, the connection comprising a first pivoting mechanism providing vertical pivoting of the slat relative to the neighbouring slat and a second pivoting mechanism providing horizontal pivoting of the slat relative to the neighbouring slat, the first crawler track being disposable around the first sprocket set and the first idler set, and each chain link has a projection longitudinally spaced from the first and second pivoting mechanisms and the projection engages a groove in each sprocket of the first sprocket set as the chain link wraps around each sprocket.

2. The crawler vehicle of claim 1, further comprising a control system in communication with the power pack for controlling speed and steering of the crawler vehicle.

3. The crawler vehicle of claim 1, further comprising one or more central blocks to which the chain links are fastened using the first pivoting mechanism and the second pivoting mechanism, the first pivoting mechanism comprising a first connecting pin along a vertical axis of the one or more central blocks and the second pivoting mechanism comprising a second connecting pin along a horizontal axis of the one or more central blocks.

4. The crawler vehicle of claim 1, wherein the first chassis is fitted with a vertical guide idler set and a horizontal guide idler set that are operably connected to the first crawler track.

5. The crawler vehicle of claim 1, wherein the first sprocket set and the first idler set are controllable to turn in a same direction to cause the first crawler track to traverse in a serpentine manner.

6. The crawler vehicle of claim 1, wherein the first idler set is steerable about the first fulcrum.

7. The crawler vehicle of claim 6, wherein the first sprocket set is steerable about the first fulcrum.

8. The crawler vehicle of claim 7, wherein the first sprocket set and the first idler set control steering of the crawler vehicle by turning in left and right directions about the first fulcrum.

9. The crawler vehicle of claim 7, wherein the first sprocket set and the first idler set control steering of the crawler vehicle by turning in varying steering angles.

10. The crawler vehicle of claim 1, further comprising a first connecting member fastened to the first chassis for attaching to a second connecting member.

11. The crawler vehicle of claim 10, further comprising:
a second chassis;
a second sprocket set rotatably coupled to the second chassis and connected to the power pack to drive the second sprocket set along the direction of travel;
a second fulcrum pivotally coupled to the second chassis along the direction of travel;
a second idler set coupled to the second fulcrum;
a second crawler track comprising a plurality of slats linked end to end to form a continuous track, each slat being pivotally coupled to its neighbouring slats to permit horizontal and vertical movement therebetween, the second crawler track being disposable around the second sprocket set and the second idler set; and
the second connecting member fastened to the second chassis for attaching to the first connecting member.

12. The crawler vehicle of claim 11 further comprising a control system in communication with the power pack for controlling speed and steering of the crawler vehicle.

13. The crawler vehicle of claim 12, wherein the control system steers the crawler vehicle by applying at least one of differential speed and differential direction steering to the first crawler track and the second crawler track.

14. The crawler vehicle of claim 12, wherein the control system steers the crawler vehicle by turning at least one of the first idler set and the first sprocket set in a left or right direction.

15. The crawler vehicle of claim 12, wherein the control system steers the crawler vehicle by turning at least one of the first idler set and the first sprocket set in an inward direction.

16. The crawler vehicle of claim 12, wherein the first connecting members is a male connecting member and the second connecting member is a female connecting member.

17. The crawler vehicle of claim 12, further comprising a hitch attached to at least one of a front and rear of at least one of the first connecting member and the second connecting member.

18. The crawler vehicle of claim 17, wherein the hitch is rotatable such that the hitch can be pressed on a ground to lift the crawler track to at least a height of a wheel.

19. The crawler vehicle of claim 11, further comprising:
four wheel hub sets comprising a first wheel hub set, a second wheel hub set, a third wheel hub set, and a fourth wheel hub set,
the first wheel hub set attaching a first tire to the first sprocket set,
the second wheel hub set attaching a second tire to the second sprocket set,
the third wheel hub set attaching a third tire to the first idler set, and
the fourth wheel hub set attaching a fourth tire to the second idler set.

20. The crawler vehicle of claim 19, wherein the first tire, the second tire, the third tire, and the fourth tire comprise rubber.

21. The crawler vehicle of claim 1, further comprising:
four wheel hub sets,
a first two of the four wheel hub sets attaching a first two tires to the first sprocket set, and
a second two of the four wheel hub sets attaching a second two tires to the first idler set.

22. The crawler vehicle of claim 21, wherein the first two tires and the second two tires comprise rubber.

23. The crawler vehicle of claim 1, wherein at least one of the first sprocket set and the first idler set rests on ground.

24. The crawler vehicle of claim 1, wherein at least one of the first sprocket set and the first idler set is above ground.

25. The crawler vehicle of claim 1, further comprising a hitch attached to at least one of a front and rear of the first chassis.

26. The crawler vehicle of claim 25, wherein the hitch is rotatable such that the hitch can be pressed on a ground to lift the crawler track to at least a height of a wheel.

27. A steerable track for a crawler vehicle, the steerable track comprising:
a plurality of slats linked end to end to form a continuous track, each slat mounted on a respective chain link, the chain link of each of the plurality of slats are connected to the chain links of neighbouring slats, the connection comprising a first pivoting mechanism to provide vertical pivoting of the slat relative to the neighbouring slat and a second pivoting mechanism to provide horizontal pivoting of the slat relative to the neighbouring slat, and each chain link has a projection longitudinally spaced from the first and second pivoting mechanisms that engages grooves in a first sprocket set as the chain link wraps around each sprocket of the sprocket set.

28. The steerable track of claim 27, wherein the first pivoting mechanism comprises a first connecting pin disposed through chain links along a vertical axis and the second pivoting mechanism comprises a second connecting pin disposed through the chain links along a horizontal axis.

\* \* \* \* \*